US005983220A

United States Patent [19]
Schmitt

[11] Patent Number: 5,983,220
[45] Date of Patent: Nov. 9, 1999

[54] SUPPORTING INTUITIVE DECISION IN COMPLEX MULTI-ATTRIBUTIVE DOMAINS USING FUZZY, HIERARCHICAL EXPERT MODELS

[75] Inventor: Martin Schmitt, Topanga, Calif.

[73] Assignee: Bizrate.Com, Los Angeles, Calif.

[21] Appl. No.: 08/748,944

[22] Filed: Nov. 14, 1996

Related U.S. Application Data

[60] Provisional application No. 60/006,812, Nov. 15, 1995.

[51] Int. Cl.$^6$ ..................................................... G06F 17/30
[52] U.S. Cl. .............................................. 707/5; 707/102
[58] Field of Search ..................................... 707/102, 1–5

[56] References Cited

U.S. PATENT DOCUMENTS

| | | | |
|---|---|---|---|
| 5,226,117 | 7/1993 | Miklos | 345/356 |
| 5,459,861 | 10/1995 | Oda | 707/2 |
| 5,515,488 | 5/1996 | Hoppe et al. | 707/3 |
| 5,535,382 | 7/1996 | Ogawa | 707/5 |
| 5,544,354 | 8/1996 | May et al. | 707/4 |
| 5,600,831 | 2/1997 | Levy et al. | 707/2 |
| 5,608,899 | 3/1997 | Li et al. | 707/4 |
| 5,655,116 | 8/1997 | Kirk et al. | 707/1 |
| 5,680,605 | 10/1997 | Torres | 707/3 |
| 5,715,444 | 2/1998 | Danish et al. | 707/4 |
| 5,724,567 | 3/1998 | Rose et al. | 707/2 |

OTHER PUBLICATIONS

Level5 Quest™, "The Fastest, Surest Way to Sift Through Mountains of Data", Level Five Research, Inc., 1995.

Kirzner, R., "Leveling Intelligence for Data Searches", Open Computing, p. 57, Nov., 1995.

Ricciuti, M., "Query Tools Link Internet with SQL Data", Info World, vol. 17, Issue 31, Jul. 31, 1995.

Oxman, S., "Level5 Quest", IEEE Expert, Intelligent Systems & Their Applications, pp. 80–82, Oct., 1995.

*Primary Examiner*—Maria N. Von Buhr
*Attorney, Agent, or Firm*—Bradley M. Ganz

[57] ABSTRACT

A database evaluation system provides for intuitive end user analysis and exploration of large databases of information through real time fuzzy logic evaluation of utility preferences and nearest neighbor exploration. The system provides for domain modeling of various types of information domains using attribute mappings to database fields, and utility value weightings, allowing multiple different domain models to be coupled with a same database of information. User interaction with the evaluation system is through an interactive key generator interface providing immediate, iterative visual feedback as to which candidate items in the database match the user's partial query. A proximity searcher user interface provides for nearest neighbor navigation and allows the user to determine which items in the database are closest to a given item along each independent attribute of the items, and selectively navigate through such nearest neighbors. A fractal proximity searcher simultaneously displays multiple levels of nearest neighbors for user selected attributes.

8 Claims, 23 Drawing Sheets

Microfiche Appendix Included
(1 Microfiche, 44 Pages)

SUPPORTING INTUITIVE DECISION IN COMPLEX MULTI-ATTRIBUTIVE DOMAINS USING FUZZY, HIERARCHICAL EXPERT MODELS

II. RELATED APPLICATION

This application claims priority from provisional application Ser. No. 60/006,812, filed on Nov. 15, 1995.

III. MICROFICHE APPENDIX

A microfiche appendix including 1 sheet of microfiche and 44 frames is included herewith.

IV. BACKGROUND

A. Field of Invention

The present invention relates to database systems for evaluation of items according to user preferences, and more particularly to database systems using domain specific knowledge and utility functions to identify items meeting user defined criteria.

B. Background of Invention

The proliferation of computers and of the exploding use of the Internet have brought with them the increasing availability of computerized databases of products, information, and services from which users, such as consumers or professionals, evaluate and purchase such items. However, the ever increasing availability of such databases to more and diverse types of users has resulted in a widening gap between the existing and the user required skills for using these databases.

There exists sophisticated tools for database mining, analysis and the subsequent generation of information from the extracted data, but none of these tools allow users to quickly and efficiently perform a frequently desired task of finding in the database the item most suited to the user's objective and subjective preferences.

A typical activity involving this type of database access is online shopping: for example, a shopper is not interested in purchasing all of the VCRs that match her criteria, but only the one that gets closest to some "ideal VCR" defined by the user's own objective and subjective criteria (e.g., low cost, high performance, reliable, etc.). Conversely, even if no items match the shopper's search criteria, she might still be interested in purchasing the item that is 'closest' or most similar to the her criteria. Current database access tools do not meet the following needs of such users for the following reasons.

First, conventional databases will often return empty search result sets where no matches found are found to the set of specific criteria input by a user; alternatively, they may return too many matches where very few critieria are specified. In either case, the user is unable to identify which items are most similar to her overall criteria, and must reformulate her search criteria.

Second, compound queries where multiple attributes are specified and which result in empty projections do not tell which criterion or group of criteria were responsible for reducing the number of matches to zero. Conversely, when too many matches are found, conventional tools provide no indication of the sensitivity of the database to each criterion. Thus, the user is unable to modify her criteria to eliminate such criteria, but must proceed by trial and error.

Third, shoppers compare items not on the basis of a single criterion, but using the concept of similarity given all or most critieria. For example, a car buyer who has identified a first car as a suitable item, may be looking for a less expensive car which implicitly would not only have a lower price tag, but simultaneously retain all other desirable features of the first car as much as possible. However, current database tools have the ability to evaluate items only along one dimension (e.g., price) without regard for the overall similarity of items along multiple dimensions, and thus are not suitable for this buyer to identify such a similar alternative car with similar features to the first car.

Fourth, many domains (automobiles, computers, financial instruments) are very complex and require significant expertise to understand at the database level ("variable valve timing", "256K cache", "0.14 negative market correlation"). The typical consumer does not have sufficient expertise to evalute different items with respect to such technical data, but does know various high level critieria that are important to their decision making. The complexity of the underlying domain makes it difficult for a shopper to formulate a query that reflects his fuzzy needs and desires, resulting in a mismatch between the results the database provides and the user's actual needs.

Finally, many shoppers are unable to describe what they are looking for with defined search criteria, but they can identify which items do not satisfy their requirements when such items are presented to them. With conventional tools, such shoppers are unable to deconstruct the domain into its constituent components and define useful search criteria which can then be used to select items from the database for further evaluation.

Accordingly, it is desirable to provide a database system that supports analysis and evaluation of the similarity of items in the database with respect to multiple critieria.

VI. SUMMARY OF THE INVENTION

The present invention, a Database Evaluation System (DES), is designed to help consumers and business users alike to find the item(s) in a database that most closely matches their objective requirements and subjective preferences. It effectively turns a database of information-rich items into an interactive buyer's guide.

The Database Evaluation System is a database technology focused entirely on the comparison and ranking of database items. The Database Evaluation System differs fundamentally from conventional database front ends in that it 1) uses a domain-specific vocabulary to isolate the user from potentially overwhelming amounts of raw data; 2) uses embedded expertise in the form of an "evaluation recipe" to guide the user along an optimal decision path; 3) provides a unique, interactive, real-time user interface for selection and navigation of items in the database; and 4) accounts for subjective, fuzzily defined user criteria.

In one embodiment, the DES of the present invention provides a system for constructing and evaluating items in a database storing any plurality of items. An authoring module enables the creation of a domain model which captures expert level knowledge about an application domain and maps the knowledge onto the database, thereby organizing the data into a useful and meaningful structure. More particularly, the authoring module creates a domain model including a hierarchical plurality of attributes in which some attribute are hierarchically defined by other attributes. For example in an automotive domain, an attribute such as performance may be hierarchically defined by attributes such as acceleration, braking, handling and the like. Each of these may be further hierarchically defined. For the lowest level attributes that are not defined by other attributes, the authoring module allows for the association of such attributes to selected fields of the database, which define the actual data stored therein. The authoring module also enables the expert to define for each attribute a transfer function that maps the values of the underlying field of the database to a utility value of the attribute. The authoring module also provide for weighting the attribute relative to other attributes, thereby weighting the utility values of one attribute relative to the utility values of other attributes. Multiple domain models may be defined for a given database, and applied by end users during access and selection of items from the database. This enables the user to apply the expert judgments of various experts to the same database of information.

The DES further includes an evaluation engine which couples a domain model to the database and provides various user interfaces for end users to access and evaluate items in the database. A first user interface receives from the user for selected attributes a user defined utility function that describes the utility of various values of the attribute for the user. The evaluation engine selects for retrieval and display items of the database according to both the user defined utility function and the utility values of the selected attributes as defined in the domain model. Fuzzy logic may be used to match the user defined utility functions with the domain model functions and database items values. The selected items are iteratively displayed in reponse to each partial input of selected attributes by the user. This allows the user to iteratively reduce the number of items selected or retrieved from the database. From the selected items, the user may create a short list of items for further evaluation. This user interface thereby allows the user to quickly identify items of the database that match the user's utility preferences, and to do so in an iterative, and interactive manner that progressively narrows the set of selected items of interest.

The system also includes a second user interface operating in conjunction with the evaluation engine that displays for each item on the user's short list a relative score of the item to other items on the short list, and further displays for each attribute a direct manipulation mechanism, for example, a graphical slider. The user can manipulate the direct manipulation mechanism to alter the relative weighting of the attribute as defined previously in the domain model. The evaluation engine redetermines the relative score of each item in the short list according to any change in the relative weightings of the attributes, and updates the display of the recomputed scores. The user may iteratively change the weightings of attributes in this manner to determine the impact of such changes on the relative scores of the short list items. This user interface enables the user to comparatively evaluate multiple items simultaneously by adjustment of the attribute weightings.

The system further includes a proximity searcher user interface, also operating in conjunction with the evaluation engine. The proximity searcher provides for nearest neighbor navigation and evaluation by displaying one of the items of the database as a reference item. For attributes of the domain model, the proximity searcher also simultaneously displays a nearest neighbor item as a function of a distance between between reference item and the nearest neighbor item for the particular attribute. The nearest neighbor item is determined not merely by the item having the next closest value of an attribute, but rather, by weighting the distance between the reference item and the nearest neighbor item for the particular attribute by the overall distance between the items with respect to all other attributes. The user can select any nearest neighbor item and make it the reference item, such that the displays of all the remaining nearest neighbor items are updated accordingly. In this fashion the user can navigate through the database to explore the relationships and similarities between items of the database, and determine which items are similar and which are not. This process further aids the user in the selection and evaluation of items from the database, enabling the user to identify items that may have been previously overlooked.

In one embodiment, the proximity searcher is extended as a fractal or recursive searcher. Each of the attributes is associated with an attribute window pane, and the reference item is associated with a reference window pane. These windows panes are displayed simultaneously. For one of the attribute window panes, the database item therein is then treated as a reference item, such that another group of attribute window panes for the remaining attributes is again simultaneously displayed with the first group of attribute window panes. Each of these additional attribute window panes displays, for their respective attribute, a nearest neighbor item for the attribute, relative to the new reference item. This selection and expansion of attribute window panes into reference window panes may be repeated through several levels of simultaneous displays, thereby visually revealing a substantial portion of the underlying relationships of the items in the database.

The DES further supports users who do not know ahead of time the specific criteria or attributes they are looking for, but know what items or attributes are not satisfactory. The DES provides a method for critiquing items in the database to determine the user's underlying criteria to determine which items the user would not select, and from there, eliminates from the database other items having attributes similar to these undesired items. In one embodiment, the DES presents to the user an item from the database for evaluation. The user inputs one or more reasons that the item is deficient or not satisfactory or would not be selected by the user. These reasons are associated with one or more attributes of the database, preferably according to a previously defined domain model. The utility value of the item's attribute associated with the reason is then used to eliminate from consideration other items of the database having an equal or lesser utility value for this item's attribute, and thereby having the same deficiency as the presented item. For example, if the user indicates that an item is too expensive, than other items having the same or greater cost are likewise eliminated. This process is repeated until the number of items for evaluation is reduced to a desired limit, thereby enabling the user to quickly reduce the number of items for consideration without having to pre-specify criteria in a search query.

Applications for the DES include interactive online shopping, electronic buyers guides, yellow pages, classifieds, and any other application where user needs to select and evaluate candidate items from a database of potential candidate using user defined, fuzzy criteria.

Items suitable for evaluation, inspection and/or purchase using the DES include consumer goods such as automobiles and home electronics; consumer services such as health care and insurance policies; financial services such as stocks, mutual funds and other investments; travel destinations and other hospitality services; real estate; electronic personals; personnel recruitment; and any other industrial or commercial goods.

The DES may be embodied in various platforms, including online environments such as commercial online services and the Internet; standalone applications in CD-ROM or floppy disk format; hybrids (CD-ROM with updating via online); and kiosks.

VII. BRIEF DESCRIPTION OF THE DRAWINGS

VIII. DETAILED DESCRIPTION OF THE PREFERRED EMBODIMENT

A. Hardware Environment

Figure 1:
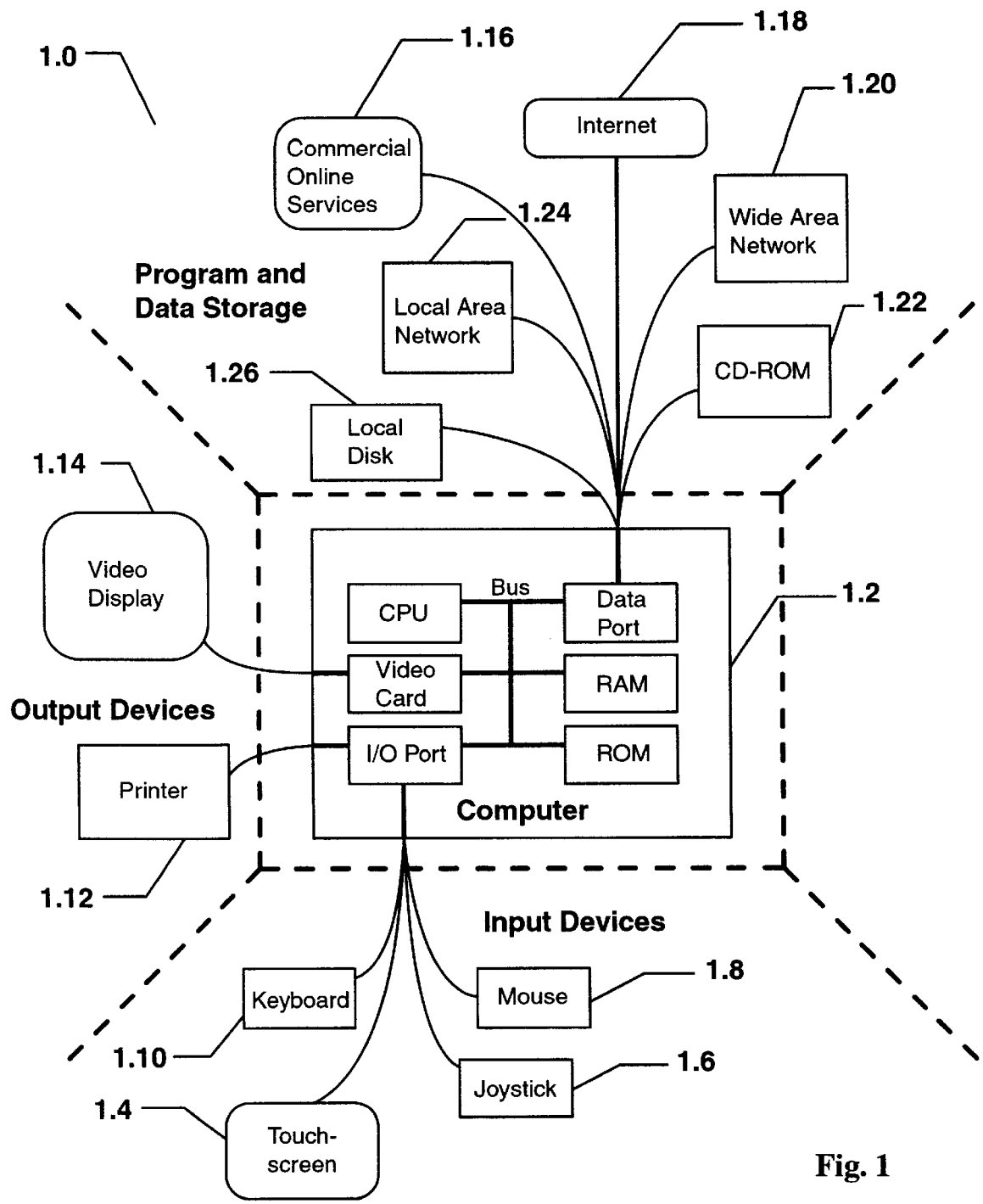
FIG. 1 is an illustration of the hardware components for one embodiment of the present invention.

Referring now to FIG. 1 there is shown a suitable hardware environment for one embodiment of the present invention. The database evaluation system 1.0 (DES) includes a conventional computer 1.2 including input devices such as touchscreen 1.4, or joystick 1.6, or mouse 1.8, and/or keyboard 1.10, or other pointing device for user input. Conventional output devices includes a display 1.14 and printer 1.12 as a graphical output device for displaying and printing records and information retrieved from the system. The invention may be implemented on any computer with the capability of accessing a database or creating one on demand. The computer 1.2 includes a conventional processor, video card, I/O ports, data ports, addressable memory (RAM and ROM). The computer executes a conventional operating system. Examples of the client portion of the hardware include, but are not limited to, Intel-based PCs running Microsoft Corp's Windowsm 3.x, 95, NT or DOS or Unix, Apple Computer Macintoshes™ running Mac/OS or Unix; Sun Microsystem, SGI or other workstation computers running Unix; personal digital assistants (PDAs) such as Apple Computer's Newton™, Motorla Inc.'s Envoy™ and other PDAs.

The DES 1.0 assess and stores data in any variety of data storage media including but are not limited to local hard disk 1.26, CD-ROM 1.22 or other mass storage device, local area network servers 1.24, wide area network servers 1.20, Internet servers 1.18 accessed via phone or cable, commercial consumer and business online services 1.16, distributed information sources such as(any combination of the above, and local RAM if data is generated on demand or linked to other program such as spreadsheet or database program executing in RAM.

The system 1.0 of the present invention may be disposed at various points of use including, but are not limited to the home (such as on a stand-alone multi-media PC connected to an online service), office (such as on a workstation computer connected to a database on a WAN), kiosk used in-store, in hospitality services or training environments.

B. Component Overview

Figure 2:
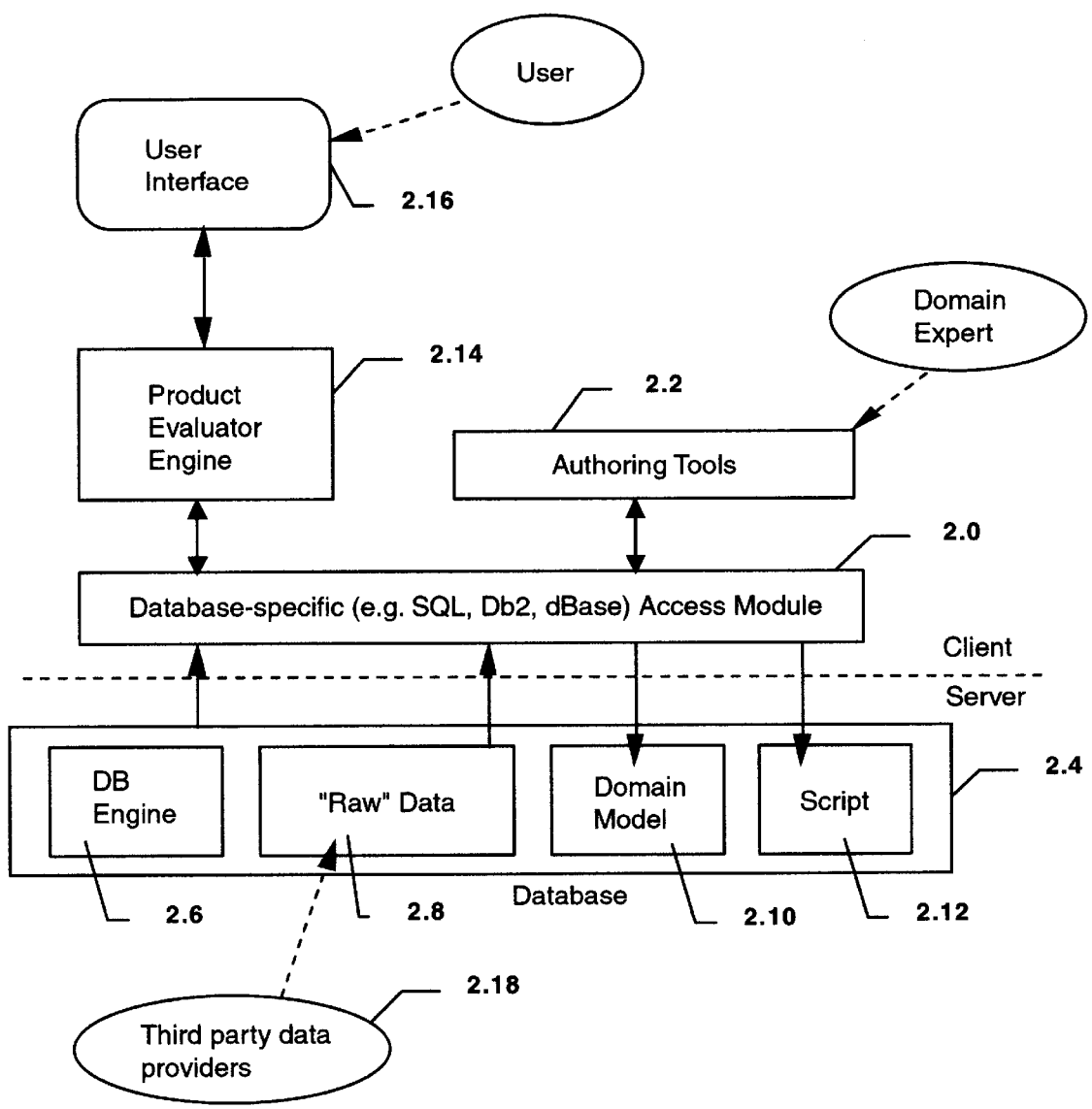
FIG. 2 is an illustration of the software components of an embodiment of the present invention.

Referring now to FIG. 2, there is illustrated the main component blocks of the Database Evaluation System 1.0. At the foundation of a decision support system built around the DES 1.0 is a domain-specific database 2.4 that contains one or more of the following: product specifications, statistical data about the product or service, empirical data such as test results, anecdotal information such as user experiences, editorial information such as magazine reviews. The domain may be of any type of information for which it is desirable to make item by item comparisons or selections of items based on various criteria, such as consumer goods or services, commerical goods or service, financial investments, and the like.

The database 2.4 includes a database engine 2.6 for storing and retrieving data from the database, raw data 2.8 which is the data stored for individual items, the domain model 2.10, and a key script 2.12.

Items in the database 2.4 are defined by and stored with a number of discrete attributes. The discrete attributes stored in the database 2.4 are abstracted into higher-level concepts by a domain expert with the help of the DES Authoring Tools 2.2. This process effectively turns raw data 2.8 into a useful domain model 2.10 of the subject domain by 1) grouping related data fields into meaningful everyday variables; 2) defining a frame of reference for evaluating database items; and 3) identifying the relative importance of particular attributes. As shown in FIG. 2, the raw data 2.8 may be supplied by third party data providers.

A user accesses the database 2.4 using a number of data visualization tools in the DES engine 2.14, including a key generator, an attribute equalizer, proximity searchers, and text queries (not shown). These elements are further described below. A data base specific access module 2.0, such as SQL, DB2, or dBase, operates to exchange data between data base 2.4 and the DES engine 2.14 and/or DES Authoring Tools 2.2. User interface 2.16 represents software through which the user interacts with the DES engine. For example, see the user interfaces depicted in FIGS. 6–9 and 13–19.

The data processing is handled by the DES engine 2.14. These tasks include database access and search, fuzzy logic evaluation, and proximity calculations, as further described below.

The program flow is partially determined by the Key Script file 2.12 authored by a domain expert and executed by the DES Engine 2.14. The operational elements controlled by the script include 1) which selection criteria are presented to the user for accessing the database; 2) the sequence in which selection critieria are presented; and 3) conditions for branching to different program phases.

A description of the major components of the DES follows.

1. DES Authoring Tools

The main task of the DES Authoring Tools 2.2 is the construction and definition of the attributes most commonly used in the evaluation of the database items.

Figure 3:
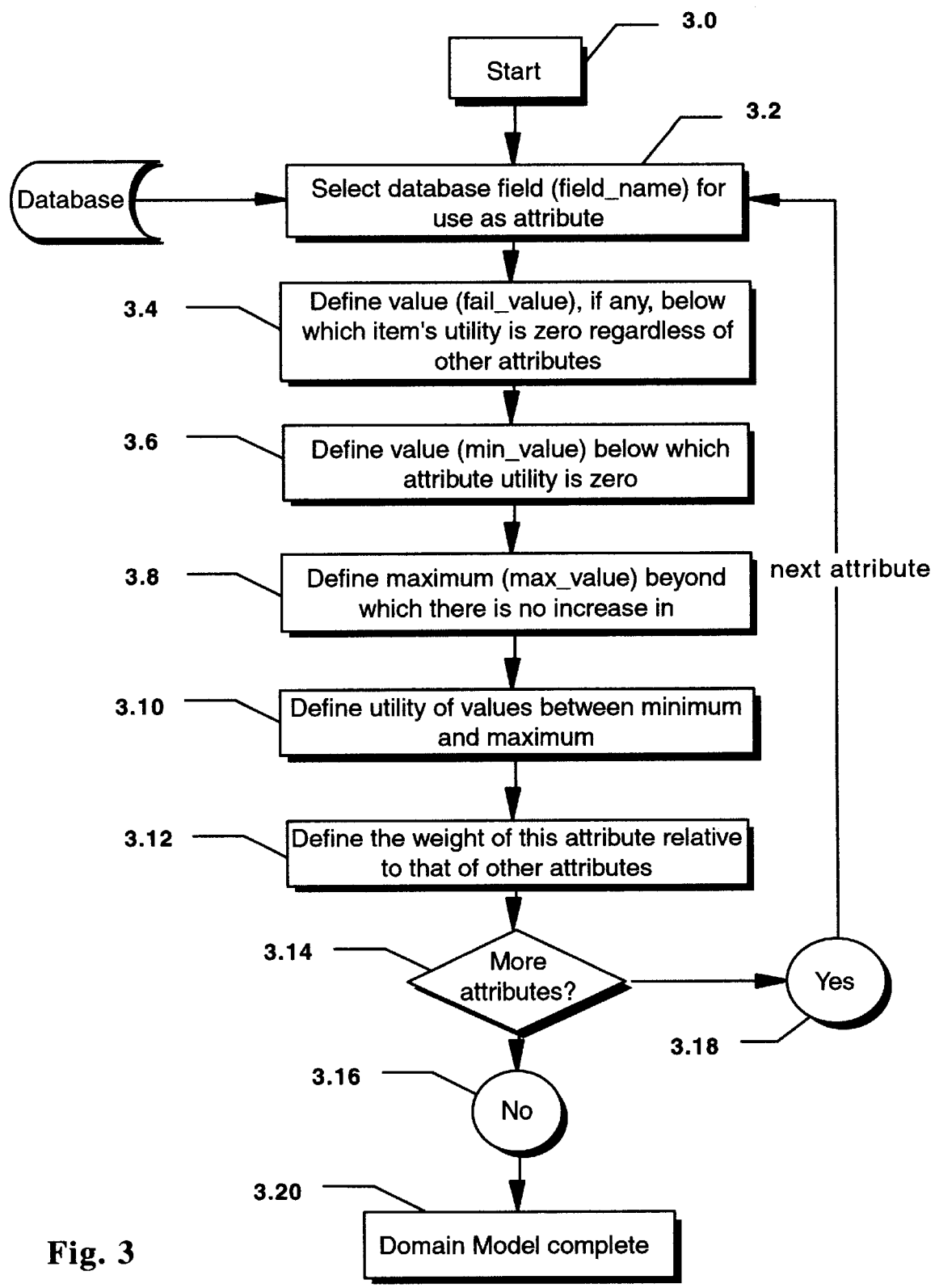
FIG. 3 is a flowchart of the process of defining a domain model.

A four-step process is followed by an iterative validation of the resulting knowledge base. FIG. 3 illustrates the details of this overall process.

First 3.0 the domain expert identifies the key terms which compose the domain-specific vocabularies for the domain model 2.10. An examplary use of the DES 1.0 is a database for evaluating automobiles by prospective customers, in effect an online car buyer's guide; this example will be used throughout this description. In this case, domain experts might include magazine editors, race car drivers, consumer safety advocates, car-nut celebrities and any other automotive analysts. In this example domain, the vocabulary may be composed of the terms Performance, Safety, Comfort, Reliability, Functionality, Economy, Styling and Fun Factor as key terms for defining the domain model 2.10.

Three considerations are important in the selection of the domain vocabulary:

Orthogonality There should be as little overlap between the definitions of any two attributes as possible. An example of highly orthogonal concepts is Styling and Reliability: changing one has no inherent effect on the other. Badly chosen attributes would be Performance and Acceleration, with the latter clearly being a subset of the former.

Completeness In as much as there should be minimal overlap between the attribute definitions, there should not be any holes either.

Realism Attributes should reflect the terminology used by the intended target audience.

Rarely will it be necessary to approach the selection from scratch. As in this automotive example, vocabularies already established for evaluations such as comparison tests in print publications will provide an excellent starting point.

Figure 4:
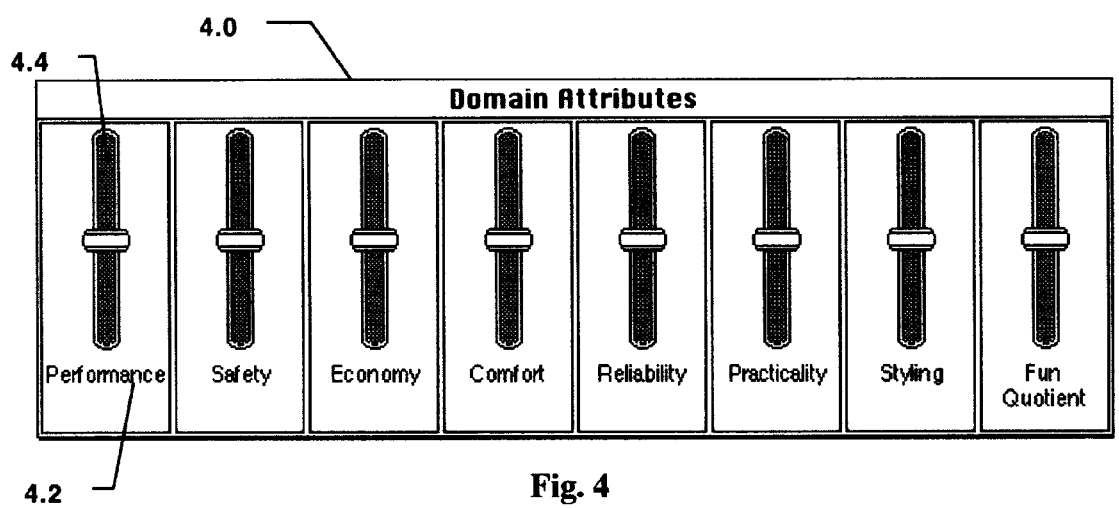
FIG. 4 is an illustration of one embodiment of a mechanism for adjusting attribute weighting during domain model definition.

FIG. 4 illustrates a group of such attributes organized in an attribute equalizer panel 4.0. Each attribute 4.2 is associated with a direct manipulation slider 4.4 that is used by the domain expert to adjust a weighting of each attribute independently.

Weights and utility values are calculated in response to changes in the attribute equalizer 4.0 in the manner described in Listing 1:

Listing 1

```
000   begin
                        Comment: to normalize weights, set total weight to zero first
001   total_weight = 0.0
                        Comment: for each slider execute the following loop
002   for each slider do
                        Comment: add the weight (setting) of this slider to the total weight
003       total_weight = total_weight + weight[slider]
                        Comment: do the next slider if any
004   next slider
                        Comment: now have the total weight
005   for each slider do
                        Comment: divide the weight of each slider by the total
006       weight[slider] = weight[slider] / total_weight
                        Comment: this makes sure that the total of all weights is 1.0
007   next slider
                        Comment: now, for each item execute the following loop
008   for each item do
                        Comment: set the total utility of this item to zero
009       total_utility[item] = 0.0
                        Comment: for each attribute, do the following
010       for each attribute do
                        Comment: calculate the weighted utility for the current attribute as the product of
                        utility as provided by value_function above and the relative weight of
                        this attribute
011           weighted_utility[item] [attribute] =
                  utility[item] [attribute] * weight[attribute]
                        Comment: add this weighted attribute utility to the total utility
```

-continued

Listing 1

```
012             total_utility[item] = total_utility[item] +
                weighted_utility[item] [attribute]
                Comment: go to the next attribute if any
013     next attribute
                Comment: go to the next item if any
014     next item
                Comment: for each item, do the following
015     for each item do
                Comment: display the item's utility (as a bar graph, printed number, etc.)
016         display (total_utility)
                Comment: or display each component in a stacked bar chart or pie chart
017         display (weighted_utilities)
                Comment: go to the next item, if any
018     next item
                Comment: end
019     end
```

The source code in Appendix A implements the above pseudo code, as well as related functionality, in one of many possible languages, in this case, C++.

Second, the domain expert identifies 3.2 which fields of the database 2.4, in the opinion of the domain expert, are relevant to the definition of each of the attributes in the vocabulary.

Figure 5:
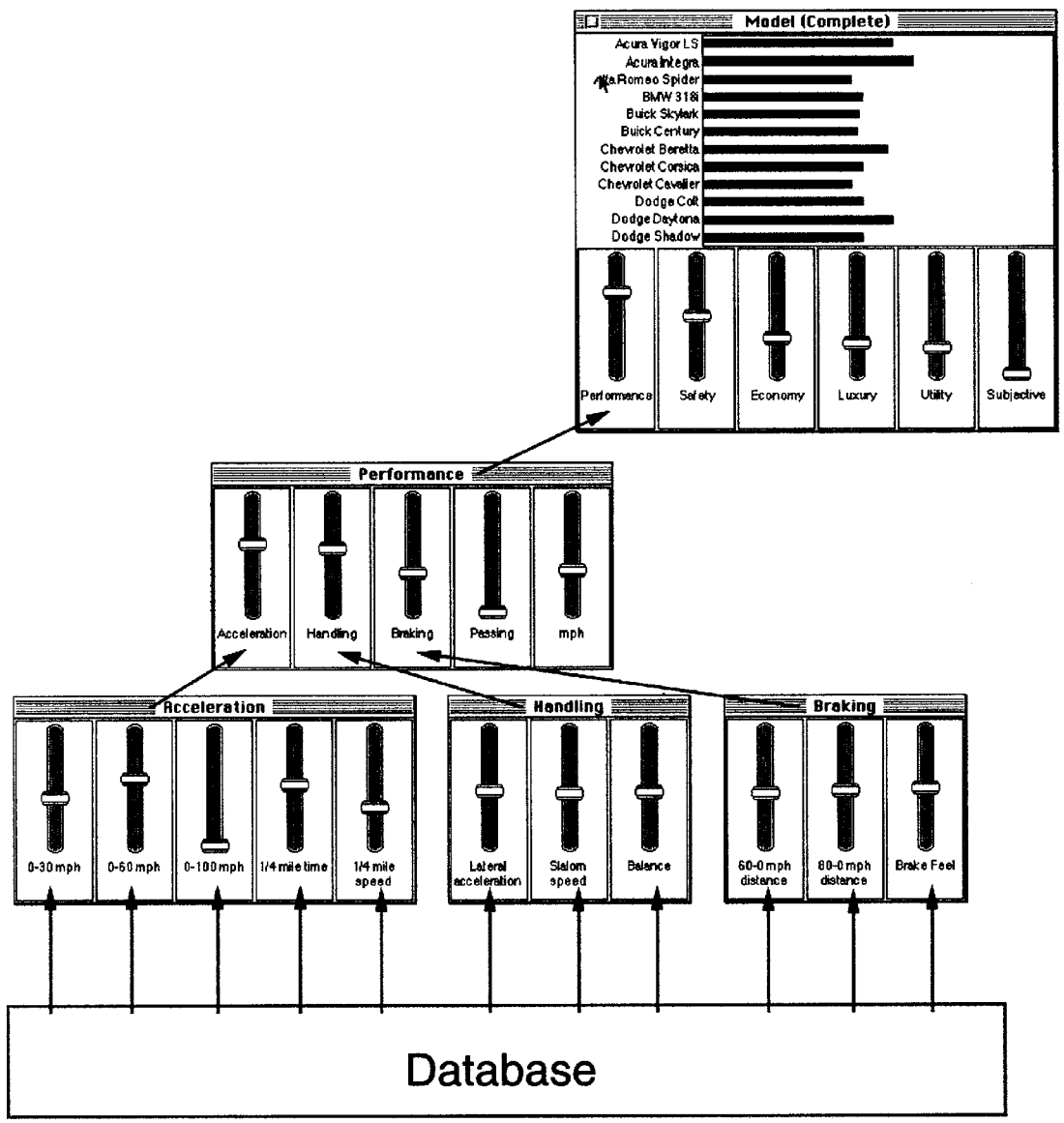
FIG. 5 is an illustration of the hierarchical definition of attributes in relationship to the database.

This process may involve the definition of intermediate terms. Performance, for example, may be defined as a combination of Acceleration, Top Speed, Handling and Braking. There is no theoretical limit to the number of intermediate levels in the resulting hierarchy. FIG. 5 illustrates a conceptual hierarchy of attributes, showing that Performance is defined by the attributes of Acceleration, Handling, Braking, Passing, and MPH. Acceleration is in turn defined by the times needed to accelerate to particular speeds, e.g. 0–30 mph, 0–60 mph, and so forth. Handling is likewise defined by attributes for Lateral accerelation, Slalom speed, and Balance. These attributes at the lowest level match individual fields in the underlying raw data 2.8 of the database.

Third, the domain expert then defines for each attribute a mapping between the values attribute and a "util" value, a fuzzy, dimensionless, theoretical utility value ranging from a minimum of 0.0, which signifies "absolutely worthless", to a maximum of 1.0, equivalent to "couldn't be better". The domain expert defines 3.6 the attribute value having the minimum utility, and the attribute value 3.8 having the maximum utility. The domain expert also defines 3.4 the attribute value below which an item will have zero utility regardless of the values of any of its other attributes. For example, a car that gets only 5 mpg may be considered of zero utility overall.

Figure 6:
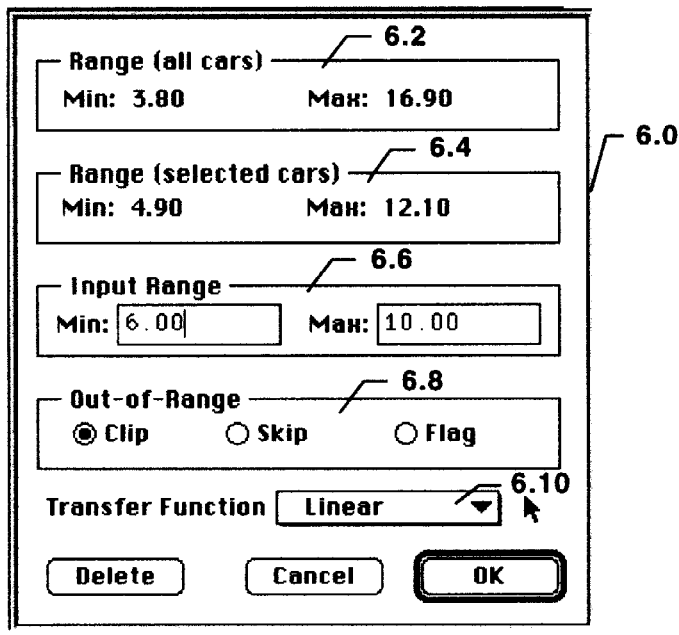
FIG. 6 is an illustration of a user interface mechanism for defining the transfer function between the utility value of an attribute and values of the database field associated with the attribute.

The dialog 6.0 shown in FIG. 6 shows one mechansim that allows the domain expert to set the minimum and maximum values 6.6, as well as defining 3.10 a transfer function 6.10 which defines the mapping relationship between the input values (raw data 2.8 in the database) to the util value. The dialog 6.0 provides information on the range 6.2 of input values for all records (for a given attribute), and for a selected set 6.4. The domain expert may also specify how out of range values of treated 6.8.

Figure 7:
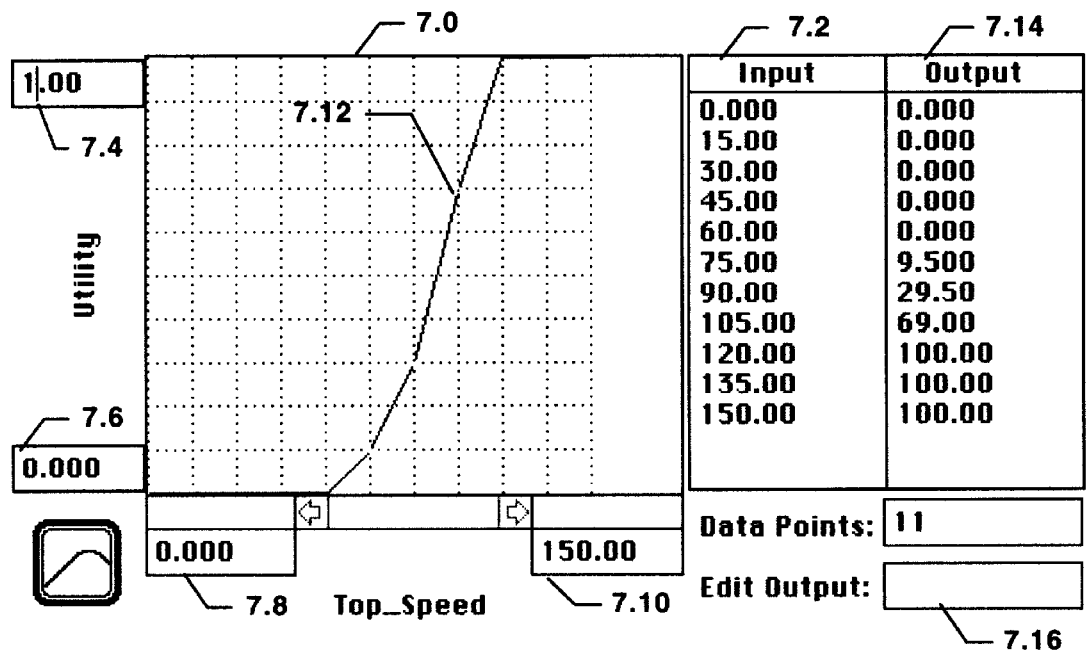
FIG. 7 is an illustration of another user interface mechanism for defining a transfer function.

FIG. 7 shows how the relationship between an attribute's value and that attribute's utility, as defined by the transfer function 6.10, is not necessarily linear. In this example, for all practical purposes a car incapable of traveling at least 60 mph scores a zero in top speed utility, as shown that an input of 60 in input column 7.2 maps to an output util value of 0.0 in column 7.14. From that speed on, though, the util value increases rapidly until it tops out at 120 mph (having a maximum utility value of 100), any improvement upon which is purely academic and does not translate into real-world utility, according to the domain expert defining this attribute. The window 7.0 in FIG. 7 also shows minimum 7.6 and maximum 7.4 util values on the y axis, and minimum 7.8 and maximum 7.10 attribute values on the x axis. Curve 7.12 shows the util values corresponding to any given point between the minimum and maximum atribute values on the x axis. Individual values may be edited manually at edit output 7.16 in order to precisely adjust the transfer function.

Beside monotonic functions such as the one shown in FIG. 7, double-valued ones are common, e.g. a car's minimum desirable weight might be determined by accident behavior, its maximum by fuel economy and handling, with a maximum utility somewhere in between.

The domain expert fine-tunes each of the definitions by assigning 3.12 relative weights, i.e. the degree of importance, to each of the constituent inputs, i.e. database fields or sub-terms, of a term. This is done by adjusting the sliders in the equalizer panel, such as shown in FIG. 4, and updating the weights, as described in Listing 1.

Figure 8:
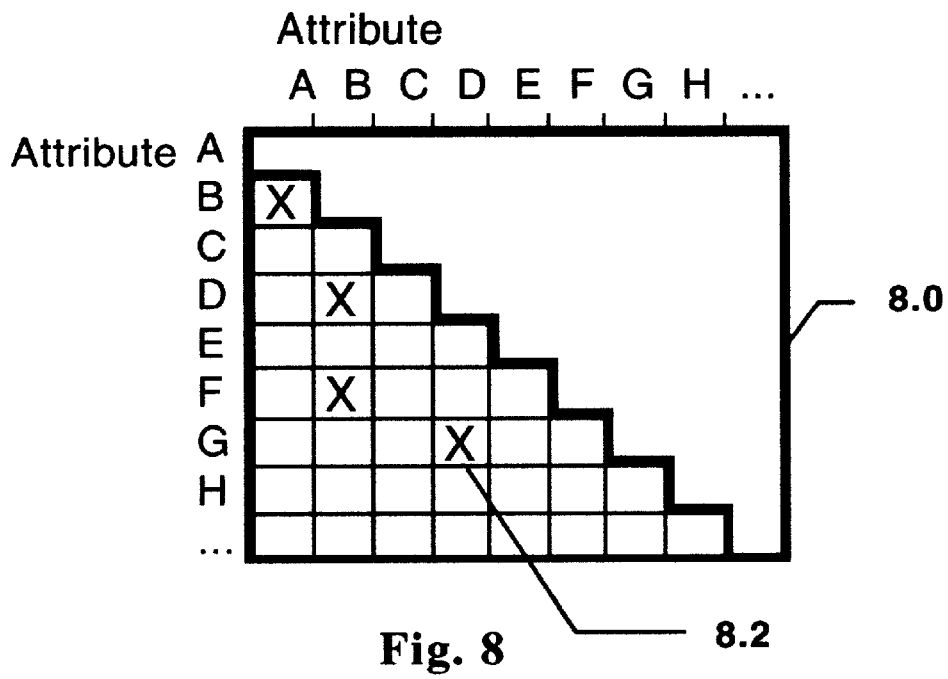
FIG. 8 is an illustration of a compensation matrix for defining compensating attributes.

Fourth, the domain expert identifies 3.12 which pairs of attributes may be considered compensatory, i.e. the shortcomings of which attribute may be compensated for by the strength of another. In addition, the degree of compensation at various combinations of input values is defined here. FIG. 8 illustrates a compensation matrix 8.0 that enables the domain expert to identify which attributes are compensatory with which other attributes by placing an "X" 8.2 at the appropriate location in the matrix 8.0. As illustrated, attributes A and B (e.g. Price and Maintenance Costs) are compensatory, as are B and D, B and F and D and G. This particular set of relationships illustrates the potential multiple interdependencies between attributes.

Figure 9:
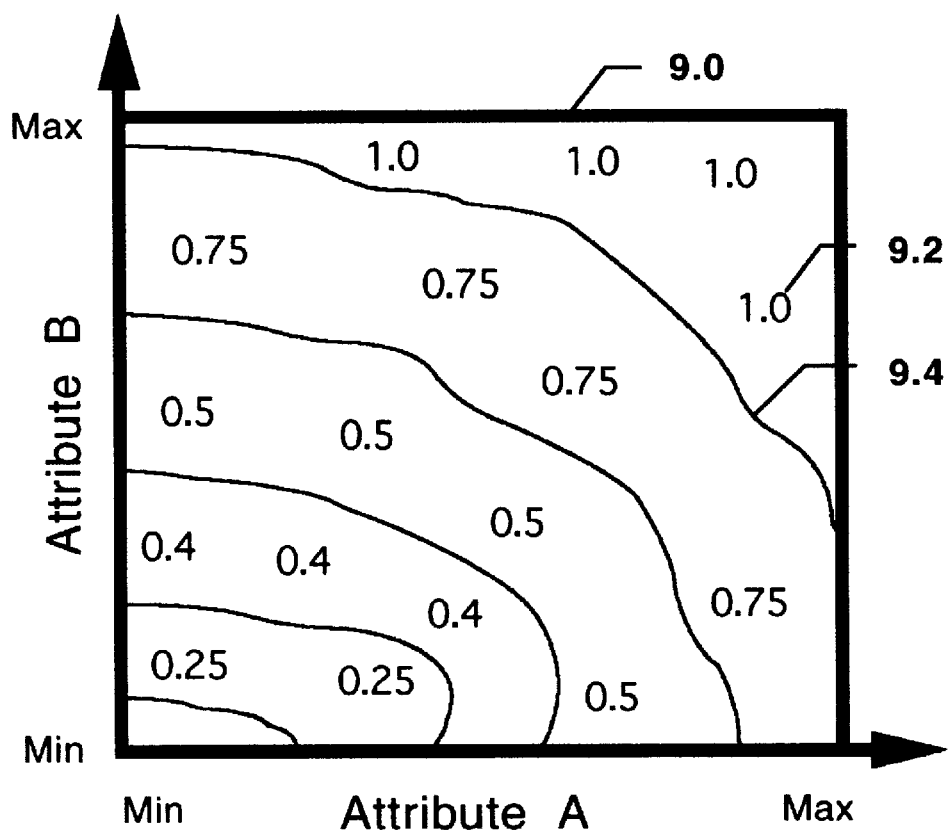
FIG. 9 is an illustration of a compensation map for defining compensation weightings between two attributes.

Each relationship between compensatory attributes is modeled individually using a compensation map 9.0 as shown in FIG. 9. This 2-D representation of a three dimensional surface defines the combined utility of any combination of Attributes A and B. The surface is interpolated from values 9.2 (0.0 to 1.0) that the domain expert "drops" onto the map, resulting in contour lines e.g. line 9.4. Relationships that share a common attribute are combined into surfaces of higher dimensionality.

Next, it is determined 3.14 whether or not there are more attributes. Referring to FIG. 3, this process of defining attributes is repeated 3.18 for each attribute that is selected by the domain expert for the domain model. When no more attributes remain 3.16, the domain model 2.10 is complete 3.20. The domain model 2.10 contains a list of attribute names, associated database fields, and the various attribute value definitions, transfer function, minimum and maximum values.

The resulting domain model 2.10 is stored as an external file. Since explicit references to field names are stored within this model 2.10 it will only work in concert with the database file that was used to create the domain model. The standalone file format makes is convenient to assemble libraries of domain models 2.10 authored by different domain experts with different points of view.

Figure 10:
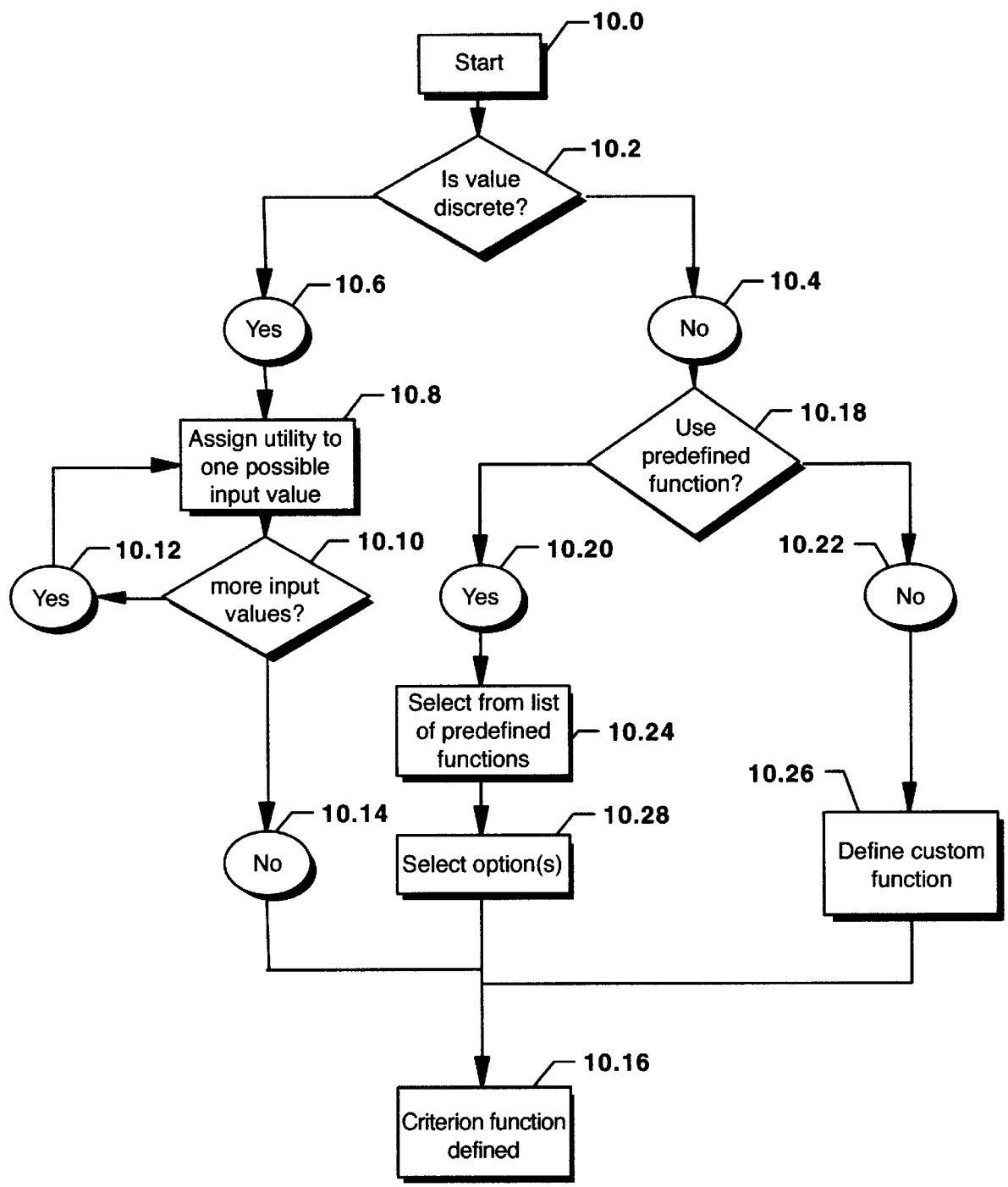
FIG. 10 is a flowchart of the process of evaluating the utility value of an attribute.

How well a database item "performs" in regards to a given domain model, i.e. its utility, is determined according to the algorithm in Listing 2, below:

011). If the attribute's value falls between the mimimum and maximum, then the utility for the item is updated (line 013) as a function of the value of the attribute and the weight of the attribute. The value_function in line 013 translates an input value of an attribute in the legal range between the minimum value and maximum value into a utility value using the transfer function 7.10. This process begins 10.0 and is illustrated in FIG. 10. Here, the value is determined 10.2 to be either discrete 10.6 or not 10.4. If it is discrete, then the utility is assigned 10.8 given the input value and the transfer function. It is then determined 10.10 whether or not there are more input values. If yes 10.12, then a utility is assigned 10.8 to the value. If not 10.14, then the criterion function 10.16 has been defined. If the value is determined 10.4 not to be discrete, a discrete predefined function may be used 10.18. If it is determined 10.20 to use a predefined

---

Listing 2

```
000   begin
                    Comment: this loop executes once for each item in the database
001   for each item do
                    Comment: initialize the utility value for this item to zero
002       utility[item] = 0.0
                    Comment: this loop executes once for each attribute in the key query
003       for each attribute do
                    Comment: get the value for this attribute for this item from the database
004           value = field_name[item]
                    Comment: test if the value is "catastrophic" (so bad nothing could
                    possibly compensate for this shortcoming)
005           if value < fail_value
                    Comment: set the item's utility to zero since item is unusable
006               utility[item] = 0.0
                    Comment: go to the end of the loop
007               go to line 15
                    Comment: if the value is not catastrophic, but below a certain minimum
008           else if value < min_value
                    Comment: then add no utility for this attribute to the current overall
                    utility total of the item and go to the end of the attribute loop
009               go to line 03
                    Comment: if the value exceeds a certain maximum value
010           else if value > max_value
                    Comment: then add the highest score (1.0) to the current utility total
011               utility[item] = utility[item] + 1.0
                    Comment: if the value is between the minimum and maximum
012           else
                    Comment: then calculate the utility for the product of the criterion
                    function return result (as described below) and the attribute's relative
                    weight.
013               utility[item] = utility[item] +
                        value_function (value) *
                        weight [attribute]
                    Comment: end of loop for this attribute. If there are more attributes to
                    process, jump back up to line 3
014       next attribute
                    Comment: end of loop for this item. If there are more items to process,
                    jump back up to line 1
015   next item
                    Comment: all attributes for all items are processed
016   end
```

---

Generally, the algorithm evaluates each item in the database (line 001), and for each attribute of the item (line 003), obtains the value of the attribute from the appropriate field in the database (line 004). The value is checked (line 005) to see if it is below the fail value, and if so, the item's utility is set to zero (line 006). Otherwise, the value is checked (line 008) to determine if it is below the minimum value, and if so there is no increase in the utility of the item due to this attribute. If the value exceeds the maximum utility (line 010), then 1 unit of utility is added to the item's utility (line function, it may be selected 10.24 from a list of predefined functions. One or more options for the function may also be selected 10.28. The outcome is a defined criterion function 10.16. If it is determined 10.22 not to use a predefined function, a custom function may be defined 10.26 to produce a defined criterion function 10.16.

The utility for each attribute is calculated according to the algorithm outlined in Listing 3, which further describes one embodiment of FIG. 10:

| | Listing 3 |
|---|---|
| 000 | begin |
| | Comment: discrete attributes can be enumerated (i.e. degrees), continuous ones can't |
| 001 | if attribute = discrete |
| | Comment: user enters number of possible input values (e.g. binary -> two) |
| 002 | num_values = user input (number of possible input values) |
| | Comment: this loop executes once for each possible input value |
| 003 | for each input_value do |
| | Comment: user enters a value between 0 and 1 for this input value |
| 004 | utility[input_value] = user input (utility value) |
| | Comment: go to next input value, if any |
| 005 | next input_value |
| | Comment: otherwise, i.e. we're dealing w/ a continuous attribute (e.g. salary) |
| 006 | else |
| | Comment: predefined functions include linear, logarithmic, exponential, etc. |
| 007 | if use_predefined_function |
| | Comment: user enters name or reference number of predefined function |
| 008 | attribute.function_name = user input (function name) |
| | Comment: user selects one or more options (such as inverse operation) |
| 009 | attribute.function_option = user input (option name) |
| | Comment: otherwise, i.e. if user wants to defined own function |
| 010 | else |
| | Comment: one possible user interface for defining the curve is shown in a separate figure |
| 011 | attribute.curve = user input (curve shape) |
| | Comment: we're all done |
| 012 | end |

The source code listing in Appendix B contains examplarly routines for manipulating the data structures necessary for the storage of domain models, as described above with respect to FIGS. 3–9, and deriving utility values from it, and described with respect to FIG. 10 and Listings 2–3. This source code example implements a version of the Database Evaluation System 1.0 for the selection of automobiles, with the exception of routine overhead functions (file and menu handling, OS calls, and so forth), which are of general application.

A second use of the authoring tools 2.2 is the creation of a script 2.12 that controls a few operational details of the DES engine 2.14 execution, such as: 1) which field of the database is used as a thumbnail preview of the item (see FIG. 13), if any; 2) which field contains a full-size image of the item, if any; 3) which attributes are presented in which order to the user for generating a short list of database items for further evaluation; 4) what are the user interface elements used for determining those attributes, and what are minimum and maximum values for each attribute; 5) what are the relative weights of those attributes.

Further details on the scripting feature are discussed in more detail in the user interface sections below.

2. Selection and Inspection of Database Items

Figure 11:
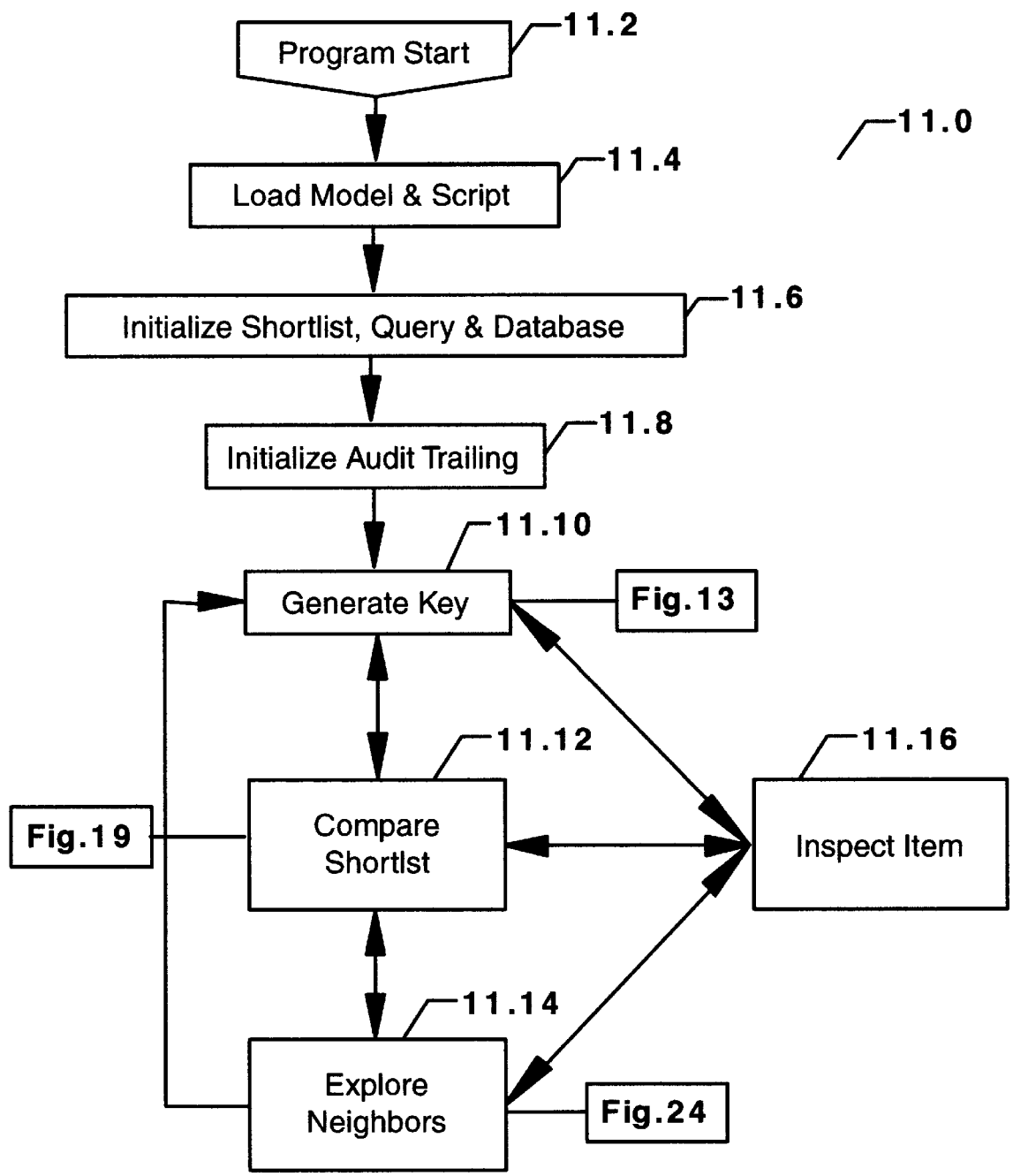
FIG. 11 is a flowchart of the overall user process of evaluating items in the database with the Database Evaluation System.

Referring to FIG. 11, there is shown the overall process 11.0 by which the user of the DES 1.0 selects and evaluates items in the database. The DES is started 11.2 by the user or other operator. The DES engine 2.14 loads 11.4 the domain model 2.10 and script 2.12 used to control evaluation of the model. A shortlist is initialized 11.6, which will contain a listing or index of items the user has selected or retrieved. The database and query structures are also initialized 11.6. An audit trail is initialized 11.8 for tracking the user's queries.

The DES engine 2.14 then generates 11.10 a visual key which allows the user to quickly evaluate items in the database. FIGS. 13–16, further described below, illustrate the operation of one type of visual key, refered to herein as the Data Viewer. From the visual key and additional query inputs, the user obtains the shortlist of database items for further evaluation, and compares 11.12 these items for their various attributes. This process of evaluation, and inputs is interactive, with the DES engine 2.14 evaluating each partial query input and immediately updating the visual key with the partial items matches. The user may decide to individually inspect 11.16 the attributes of an individual item displayed in the visual key, obtaining detailed information about the item. The user may also explore 11.14 neighbors of the item in the database using a proximity searcher, herein refered to as the Navigator. A neighbor is an item having similar attribute values to another item. Exploration of neighbors is done by a nearest neighbor evaluation of attributes of other database items.

Figure 12:
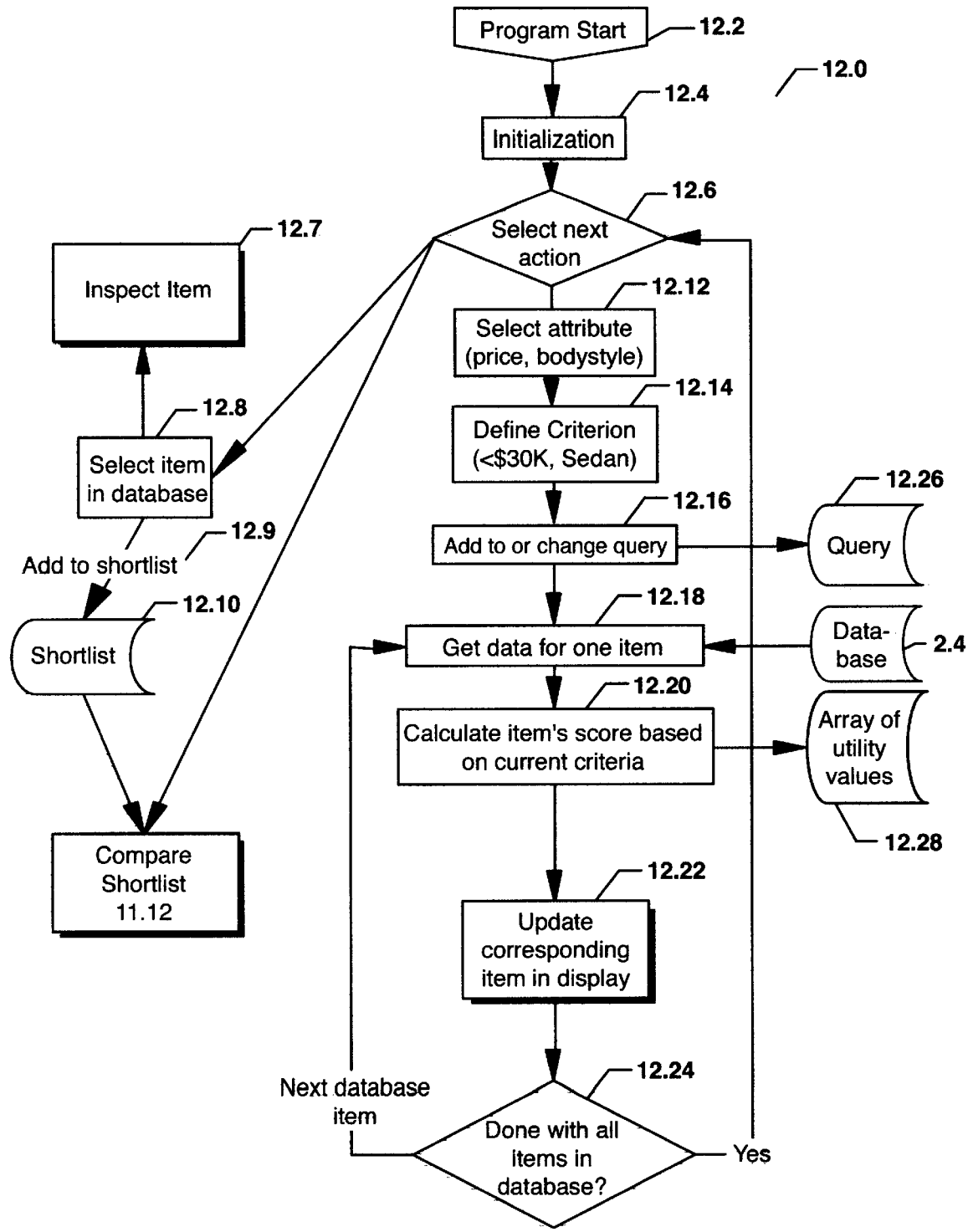
FIG. 12 is a flowchart of the operation of the DES in evaluating database items.

FIG. 12 provides a detailed flowchart of the selection process including generation of the shortlist and visual key by iterative selection of critieria.

C. User Interface Elements

The process of selection, comparison, inspection and navigation of database items by user is handled by three user interface modules:

A. Data Viewer
B. Attribute Equalizer
C. Navigator

1. Data Viewer

Most database front ends display the result of a search in summary form, either textually as "32 items out of 256 found", or in the form of a graph indicating the same. This is usually the result of the user initiating a search against her query. Improperly constructed, or narrowly defined, queries often result in no matches at all, at times after considerable effort has been put into the query definition.

An example from the domain discussed here, automobiles, is the construction of a query that searches for rotary-engined minivans for under $9,000 that have a top speed exceeding 150 mph. Many conventional front ends do not alert the user after the second criterion is defined that any further elaboration is moot since the selection list—the list of database items matching the query—is already empty.

In contrast, the Data Viewer displays, at all times during query construction, a window with thumbnail graphical representations of each item in the database currently matching the query. Initially, each item is considered a match when no query is specified. With each step in the process of defining the selection criteria (i.e. a query), a search is run in the background and the resulting score for each item is reflected in one of several, user-selectable ways: the thumbnail corresponding to a particular item changes in size, hue or color according to the score.

In the case of only a few hundred database items, performance even on low-end machines like 386s allows real-time screen updates, giving the user instant feedback as the selection criteria are changed.

Figure 13:
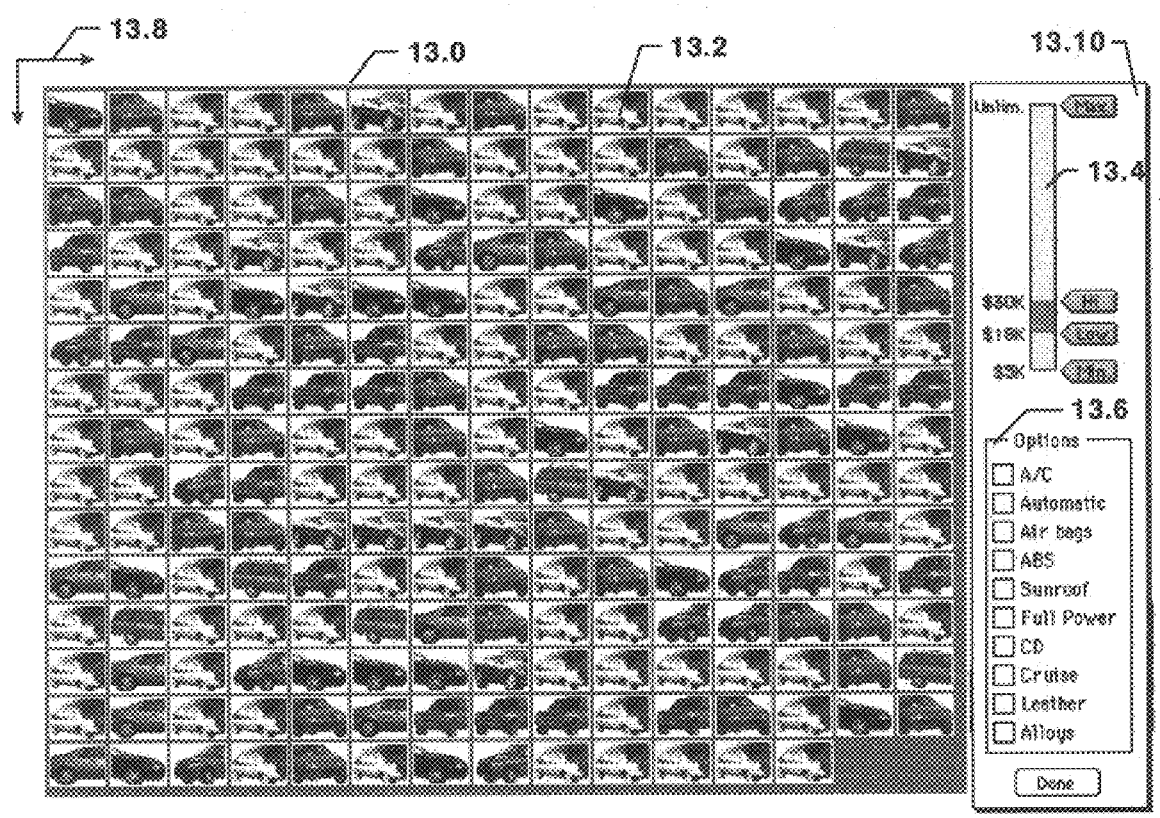
FIG. 13 is an illustration of one embodiment of a Data Viewer for viewing selected items in the database.

FIG. 13 illustrates one embodiment of this graphical representation of data by the Data Viewer 13.0. The Data Viewer 13.0 includes a results window 13.8 that contains a plurality of thumbnail images 13.2. Each thumbnail 13.2 represents one of database items, here one of the 223 cars in the database. In this particular online application, vehicles are visually differentiated only by bodystyle as to minimize the amount of graphic images that need to be downloaded from the database.

FIG. 13 shows the initial state of every item matching a yet-to-be-defined query or set of selection criteria. The results window 13.8 depicts each item, in this case automobile models, in iconic form (the number of vehicles in the database was insufficient to fill the last row, thus there are two cars "missing").

Figure 14:
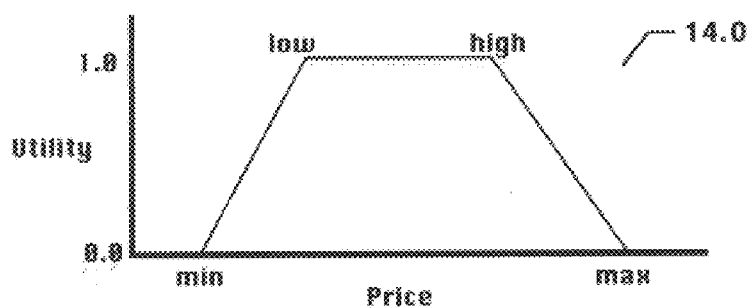
FIG. 14 is an illustration of a user defined utility function for an attribute.
Figure 15:
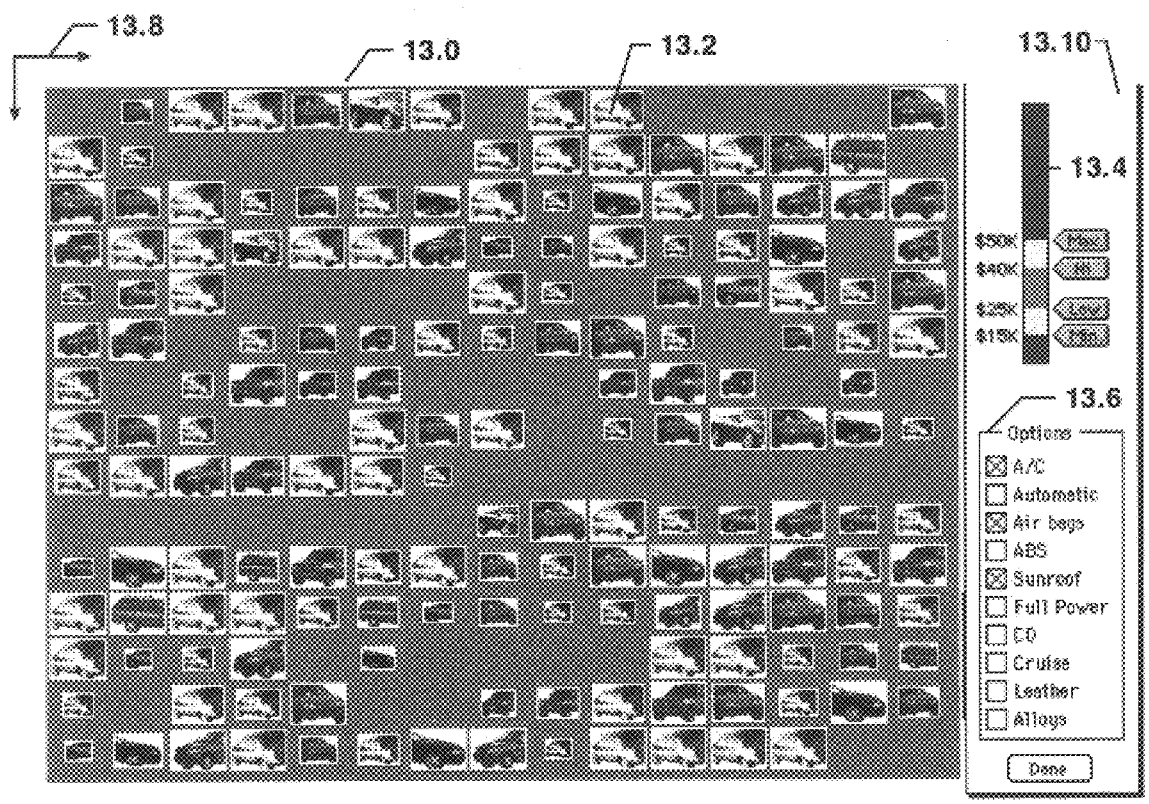
FIG. 15 is an illustration of the Data Viewer following matching of an initial user query.

For each attribute of an item, the user may establish criterion for evaluating the attribute, essentially providing a user weighting to the attribute. The controls window 13.10 displays the slider controls 13.4 for each criterion used in the query, in this case price. The slider control 13.4 in this example allows the user to define four points of weighting for any attribute, which can then be internally translated into a utility function 14.0, as shown in FIG. 14. The ability to adjust the weighting of an attribute introduces the element of fuzziness. Since the result of the search is not a simple match or non-match, but a suitability rating on a sliding scale of 1 to 10 (or 0.0 to 1.0, or any other arbitrary, continuous scale), it can be represented as a partial match such as illustrated in FIG. 15. A pane 13.6 may also be included in the control window 13.10 to allow a user to screen items according to specific features of items. In the example, shown, the features are vehicle options.

In FIG. 15 the size of a thumbnail of an item is proportional to the score of the item, i.e. how well the item fits the selection range (i.e. between 18 and 30K: full size, from 30K up to 50K the size shrinks, as well as from 18K down to 5K), given the slider position in the control window 13.10 and the corresponding fuzzy weighting.

Figure 16:
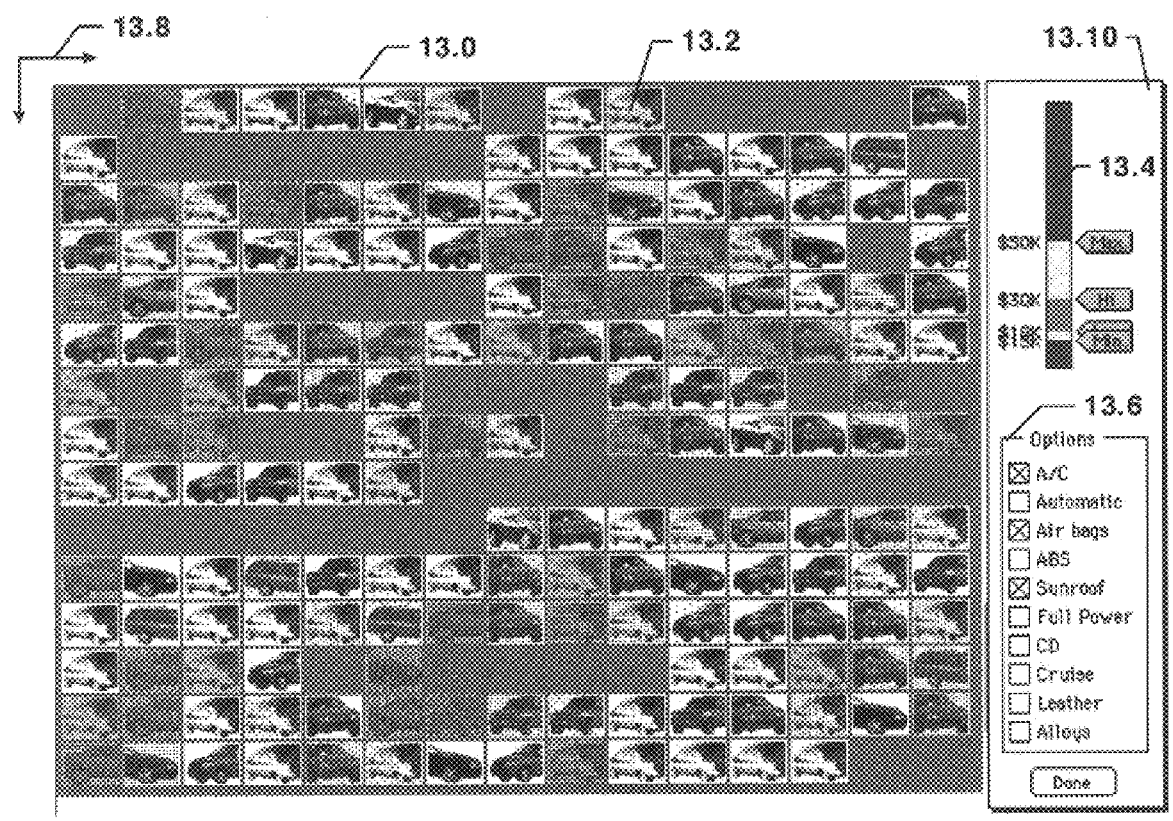
FIG. 16 is another illustration of the Data Viewer following matching of an initial user query.

An alternative method of reflecting the match index is by fading out to the thumbnail. This is shown in FIG. 16.

FIG. 12 provides a detailed flowchart 12.0 of the operation of the DES in evaluating database items. The program is started 12.2 and initialized 12.4. The user may then select 12.6 an action. The actions may include, for example: selecting 12.8 an item in the database, and subseqquently inspecting 12.7 and/or adding 12.9 the item to a shortlist 12.10. The actions may also include comparing items on the shortlist to each other. Referring to FIG. 12, the user selects 12.12 various attributes, and defines 12.14 critierion for each attribute using the control window 13.10 slider control. The DES engine modifies 12.16 or expands 12.16 the current query 12.26 to incorporate the new criterion 12.14. The DES engine 2.14 then evaluates 12.18 each item in the database until all items have been evaluated 12.24, calculates 12.20 the items score based on the item's attribute values, and updates 12.22 the corresponding item in the display, and upon the critierion and utility function defined by the user, using a fuzzy logic evaluation and creating an array 12.28 of utility scores for the items. The DES engine 2.14 updates the Data Viewer 13.0 or other visual key display. The user may add 12.9 individual items to her short list 12.10 for further evaluation and inspection. Successive, iterative selection of criteria (such as, in this example bodystyle, engine and safety features) further reduces the number of database items on the shortlist 12.10. These criteria, and the sequence in which they are presented to the user, is determined by the aforementioned script 2.12 that is produced by the authoring tools 2.2.

Listing 4 is the pseudo-code for one embodiment of the Data Viewer routine.

Listing 4

```
000   begin
              Comment: we keep track of the current score for each item
001   create (total_score_array)
              Comment: it's up to the user to select attributes, so we don't know how often to
              loop
002   while (user selects attribute) do
              Comment: we store the score of each item for this attribute in this array
003       create (attribute_score_array)
              Comment: depending on the attribute type, we expect different return values
              from UI
004       case attribute type of
              Comment: this is usually implemented as a simple check box (yes or no)
005           binary:
                  Comment: user interface returns a boolean value
006               get criterion = boolean from user_interface
                  Comment: usually implemented as a radio button
007           one_of many:
                  Comment: user interface returns a single integer indexing one of the possible
                  choices
008               get criterion = integer from user_interface
                  Comment: usually implemented as a series of check boxes or multi-selection list
```

Listing 4

```
009         many_of_many:
                    Comment: UI returns an array of integers (first element indicating array length)
010                 get criterion = integer_array from
            user_interface
                    Comment: this can be implemented as a slider, a knob, a data field, etc.
011         single_number:
                    Comment: UI returns a single value indicating a maximum, min, ideal, etc. value
012                 get criterion = real_number from
            user_interface
                    Comment: usually implemented as a dual thumbed slider, two sliders, two fields . . .
013         number_range:
                    Comment: UI returns two floating point values
014                 get criterion = real_range from user_interface
                    Comment: usually implemented as a graph/slider combo w/ bell curve over target
                    value
015         fuzzy_number:
                    Comment: UI returns three value pairs describing curve
016                 get criterion = fuzzy_number from
            user_interface
                    Comment: usually implemented as dual-point (min, max) graph/slider combo
017                 fuzzy_range:
                    Comment: UI returns four value pairs describing max range w/ fall-off
018                 get criterion = fuzzy_range from
            user_interface
                    Comment: end of possible data types
019         end of case
                    Comment: for each item in the database we do the following loop
020         for each item do
                    Comment: get the value for the attribute of this item from the database
021             get item_attribute_value from database
                    Comment: convert item's value to a score from 0.0 to 1.0
022             item_score = value_to_score (item_attribute_value,
                    criterion)
                    Comment: multiply individual score w/ total score so far for this item (note that if
                    the score for this item is 0.0, the total score is 0.0 as well, i.e. one strike and the
                    item is out.
023             attribute_score_array[item] =
                    attribute score_array[item] * item_score
                    Comment: display item modified according to its score
024             display (item, attribute_score_array[item])
                    Comment: go to next item, if any
025         next item
                    Comment: let user choose another attribute
026     next attribute
                    Comment: end of short key definition
027 end
```

The source code listing of Appendix C provides an examplary embodiment of the Data Viewer.

a) Critique Mode

No matter how well chosen the attributes of the domain model are, there will always be cases of non-analytical, indecisive users who are unable to define their criteria tightly enough to end up with a manageably-sized short list.

This problem is addressed by a critique mode of the Data Viewer which is invoked either by the user or automatically by the DES engine 2.14 under certain conditions, such as by elapsed time, short list size, and the like.

In the critique mode, one of the items in the database is selected for critique. The goal is to identify an item 17.4 that the user would not consider as a candidate for the shortlist. Either the DES engine 2.14 automatically selects an item and confirms with the user that it is indeed ineligible, or the user manually picks such an item.

Figure 17:
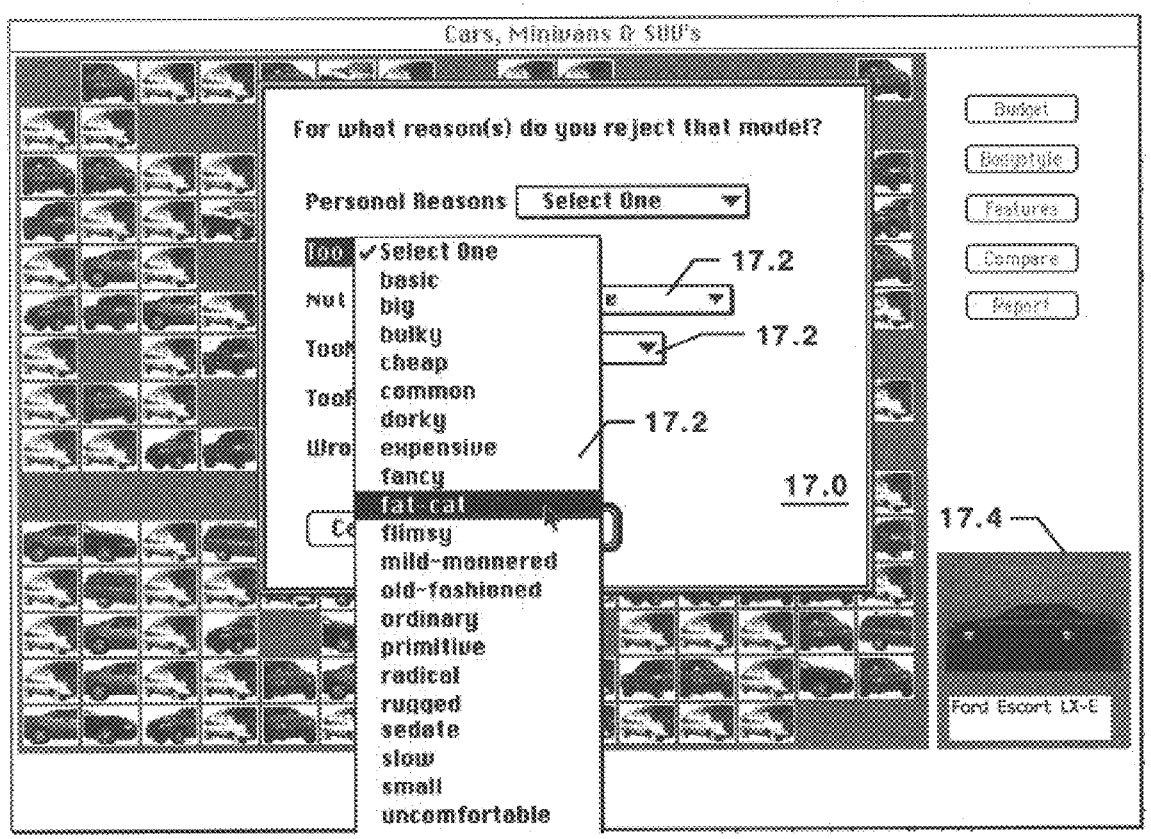
FIG. 17 is an illustration of a critique mode for defining user criteria through selective elimination of database items.

In order to "back into" a criterion list—establish the criterion from the user's selections—the user is then presented with the dialog that prompts the user to establish why the selected item would not be included in the shortlist. One such dialog is shown in FIG. 17. The dialog 17.0 includes various menus 17.2 of reasons why the user would not select the item. The user selects reasons from the menus which best describe why the item was not selected. If the user is able to select one or several reasons from the dialog choices, she is then asked if that criterion can be generalized and applied to all other cars to which is applies equally. If the user confirms, the program will have ascertained one more criterion and based on it will be able to eliminate other items from the selection list that share the same deficiency by having equal or less utility value for the attribute that is associated with the selected reason as does the presented item.

This process repeats until a manageable short list 12.10 is arrived at, or the user creates a short list by manually selecting the items of choice. At this point, program operation proceeds to the following comparison phase.

2. Attribute Equalizer

In traditional multi-attribute comparisons such as printed consumer product reviews and test, it is the editor's task to define the relevant attributes and their relative weights. A final score for each contender is determined by adding the products of the item's rating for each attribute times that attribute's weight:

$$S_{Car} = \sum_{i=0}^{n} U_i W_i$$

where
S=total Score
n=Number of attributes
U=Utility value
W=relative Weight of an attribute
i=attribute Index The Attribute Equalizer makes that process dynamic and puts users in control by allowing them to: 1) select from a variety of attributes the ones most relevant to them; 2) change the definition of those attributes; and 3) change their relative weights in real-time.

These added degrees of freedom demonstrate an item's sensitivity to particular weight settings and how different preferences change the outcome of the comparison, while increasing a user's awareness of what considerations go into a decision.

Figure 18:
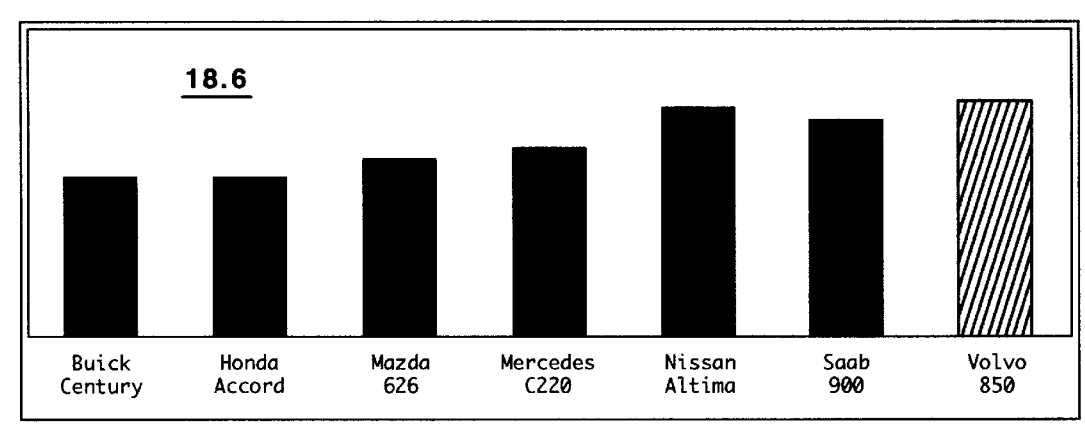
FIG. 18 is an illustration of one embodiment of an Attribute Equalizer for evaluating items on a short list of items.
Figure 18:
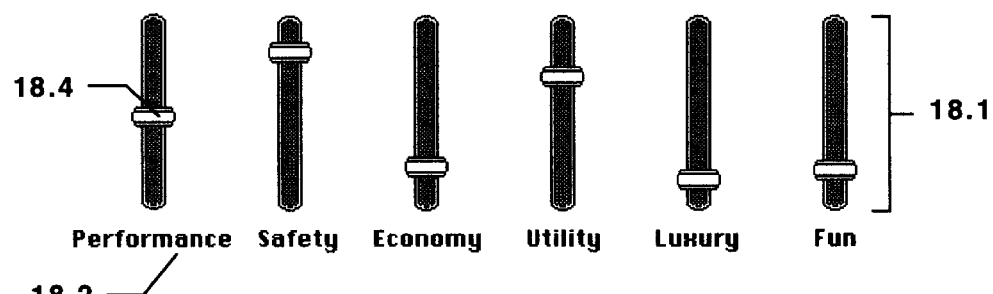
Figure 19:
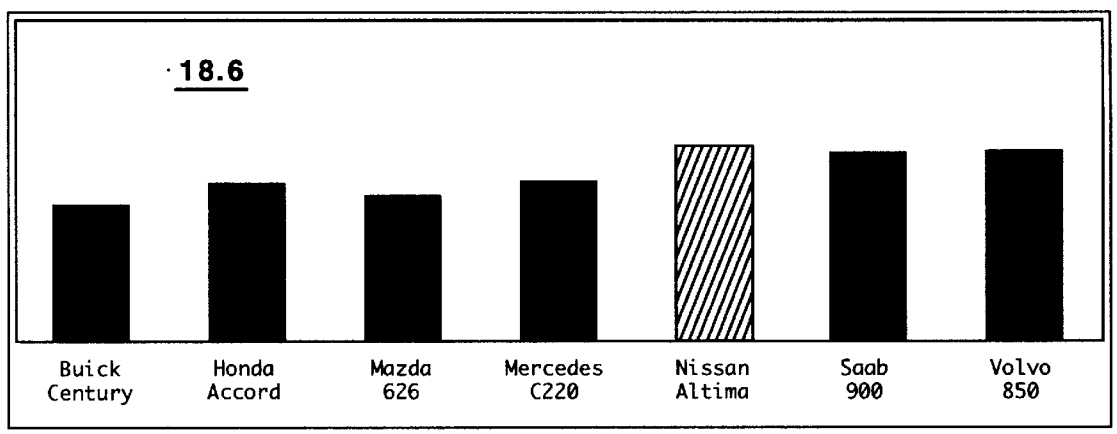
FIG. 19 is another illustration of the Attribute Equalizer following user inputs to alter the relative weighting of attributes.
Figure 19:
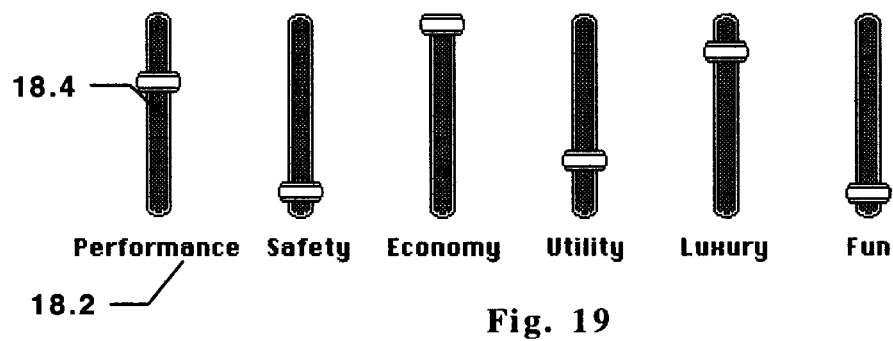

The Attribute Equalizer utilizes a two-part graphical user interface, as shown in FIG. 18. The control part 18.1 is analogous to an audio equalizer, with each slider 18.4 controlling the relative weight of a particular attribute 18.2. The upper display part 18.6 is a bar chart that displays the rating of each item in real-time, using a variety of display modes.

The example of FIG. 18 lets a car buyer compare a number of cars on the basis of attributes such as Safety, Performance, Luxury, Utility, Economy (which would be derived from a database) and Fun (which is a subjective value determined by the editor, or manually entered by the user).

The particular setting of sliders 18.4, i.e. weighting of attributes, in FIG. 18. results in the Volvo scoring highest. A different combination of preferences such as those in FIG. 19 can change the outcome significantly.

Figure 20:
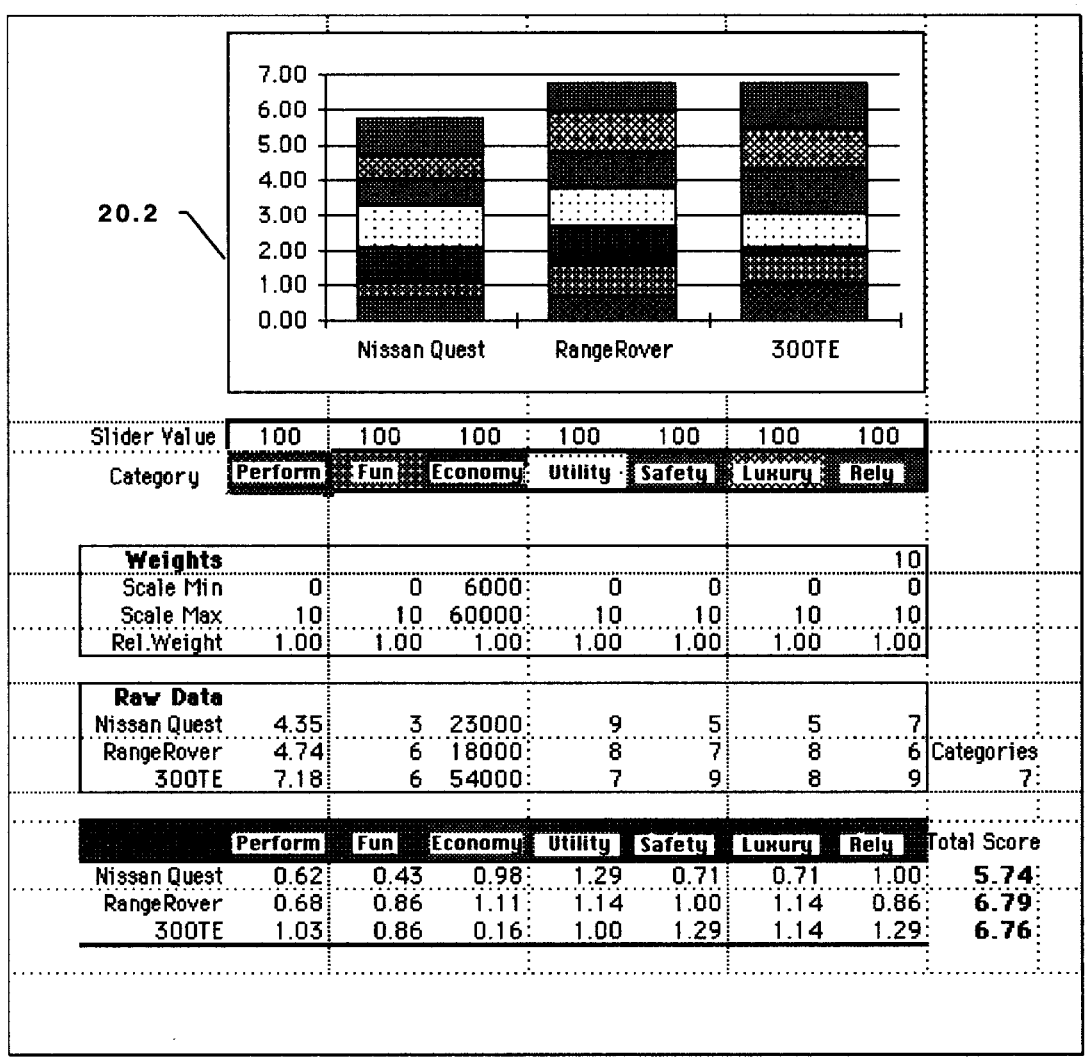
FIG. 20 is an illustration of stacked bars used in the Attribute Equalizer.

A car's rating for a given attribute is expressed as a value between 0 (no utility, i.e. lowest possible score) and 1.0 (highest utility, i.e. perfect score). Each bar in the graph above is composed of the weighted utility of the car for each attribute. A stacked bar chart 20.2 as in the Excel example in FIG. 20 illustrates that fact, where each shaded region of a bar corresponds to the utility contribution of a single attribute.

Figure 21:
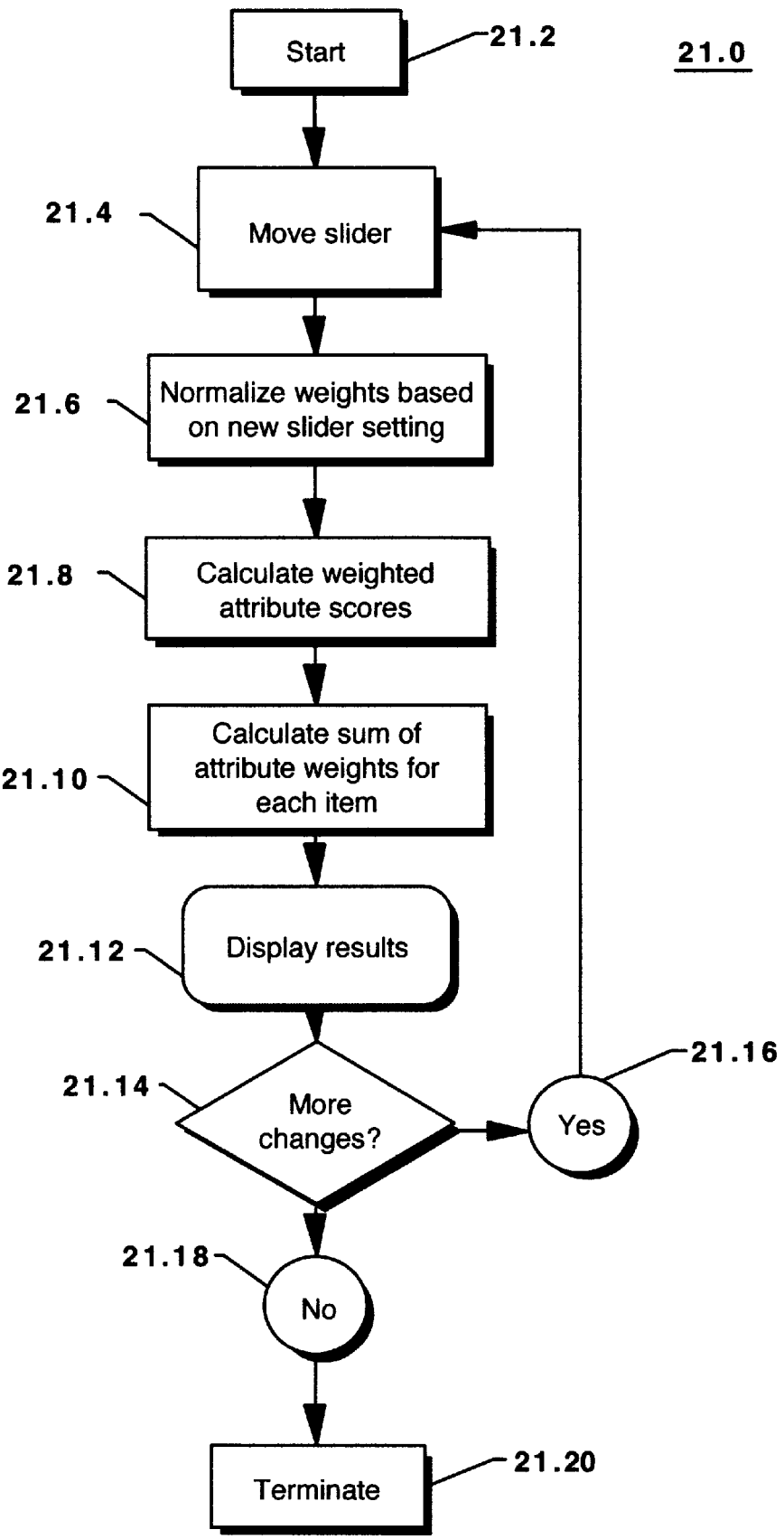
FIG. 21 is a flowchart of the process of updating the Attribute Equalizer.

The flowchart in FIG. 21 demonstrates the process 21.0 of changing weights. The process is started 21.2 and the user moves 21.4 one of the sliders 18.4. The Attribute Equalizer normalizes 21.6 the weights of all attributes based on the new slider setting, and then calculates 21.8 weighted attribute scores for each attribute. The sum of the attribute weights for each item in the database is calculated 21.10, and the results displayed 21.12 in the display panel 18.6 of the Attribute Equalizer. The Attribute Equalizer monitors 21.14 for any more changes in the slider positions, and if so 21.16, responds accordingly with another iteration. Otherwise 21.18,the attribute weighting process is terminated 21.20.

Weights and utility values are calculated as defined in the pseudo code of Listing 1, above.

Additional features supported by the Attribute Equalizer include:

Predefined evaluation models

Domain models may be contributed from a variety of authors for user's selection, modification or combination.

Customizability

Hierarchical pulldowns that reflect the entire model hierarchy down to the database fields let users construct their own set of relevant attributes.

Reverse Operation

Allows a user to select the desired "winner". The program will attempt to reverse-engineer a set of corresponding weights to support the "decision", if such a set does indeed exist.

"Explain mode"

Definitions of attributes can be revealed to the user in layers of progressively more detail.

Multiple display modes

The default mode aggregates the individual scores of each attribute into a single total utility value and displays such as a bar. Alternative modes include:

Stacked bar chart

Each attribute's contribution is color-coded and keyed to the corresponding slider, as shown in FIG. 20.

Pie/bar combination

The bar references a pie chart the slices of which recursively reference constituent pie charts down to the database level.

Variable-size pie

The bar is replaced by a pie the size of which is relative to the score.

Absolute slider mode

In this mode, the slider setting does not indicate the relative weight of an attribute, but a desired level of utility for that attribute. Scoring is done by adding the surpluses and deficiencies separately and displaying the results in a bipolar bar chart.

3. Navigator

The Navigator is a proximity searcher. At any stage of the program, this user interface module can be invoked by selecting a database item. The selected item will become the reference to which other items are compared using a proprietary proximity metric for proximity based searching.

The purpose of this tool is to find the "nearest neighbor" items that are most similar to the reference item overall, but differ from it according to a particular attribute.

Significant elements of this methodology include:

Proximity metric

The degree of similarity between two database items is defined as the $n^{th}$ root of the weighted $n^{th}$ powers of the difference between the items attribute utilities.

n-dimensionality

The Navigator supports as many dimensions as can be reasonably resolved by the display device.

Similarity indicator

The degree of similarity can optionally be indicated by the distance between the reference item and the nearest neighbor.

Quick comparison

At user request, a list of pluses and minuses is automatically generated from the differences between two neighbors.

Fractal nature

Depending on the resolution of the display device, multiple generations of neighbors may be displayed in successive Navigators, allowing one-click access to neighbors more than once removed.

Figure 22:
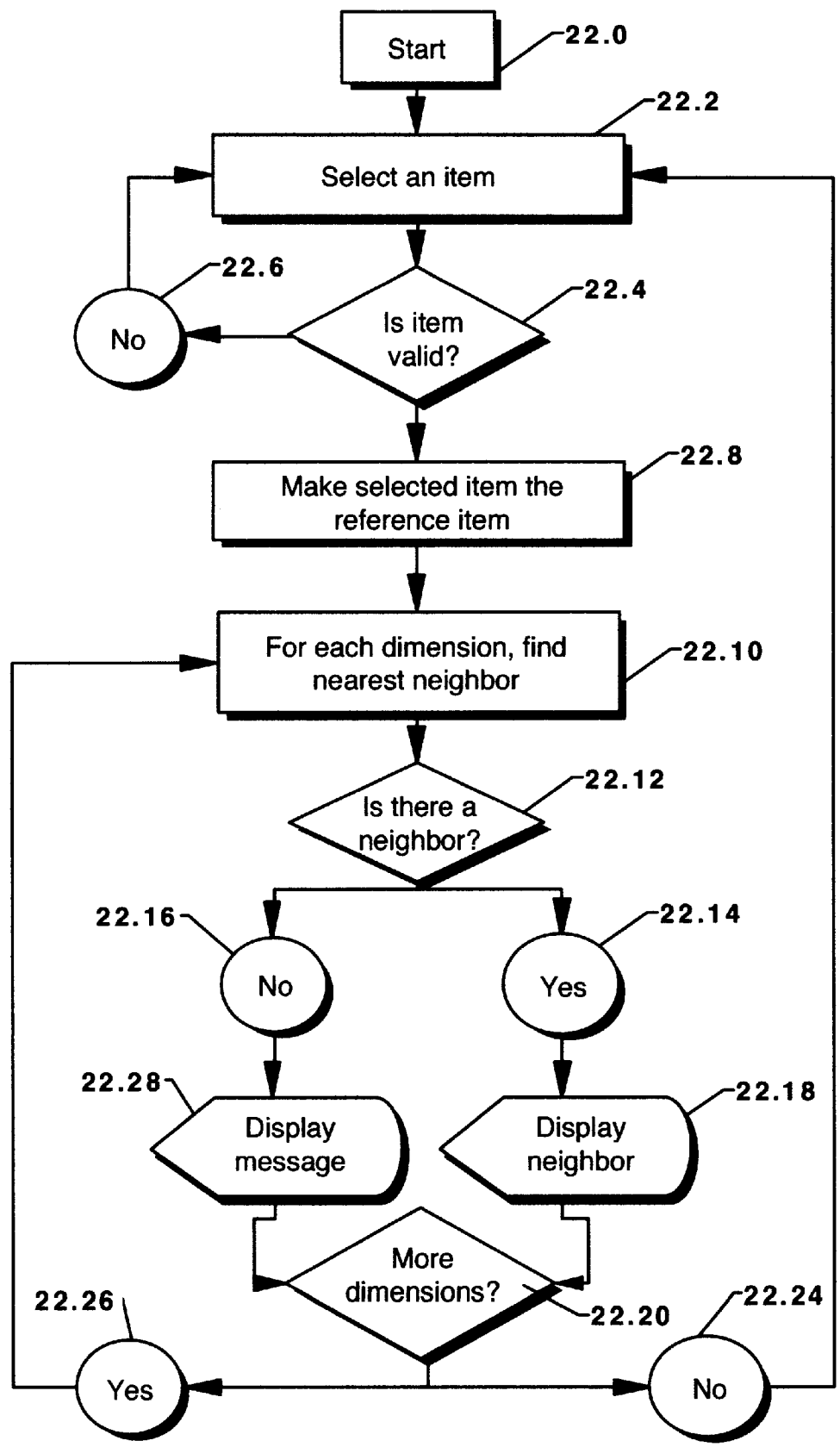
FIG. 22 is an illustration of the process of nearest neighbor searching in the Navigator.

The process of traversing the nodes of the "nearest neighbor web" is shown in the flowchart in FIG. 22.

To demonstrate the usefulness of this navigational tool, assume a case in which the user tries to visually locate items in three dimensions.

Figure 23:
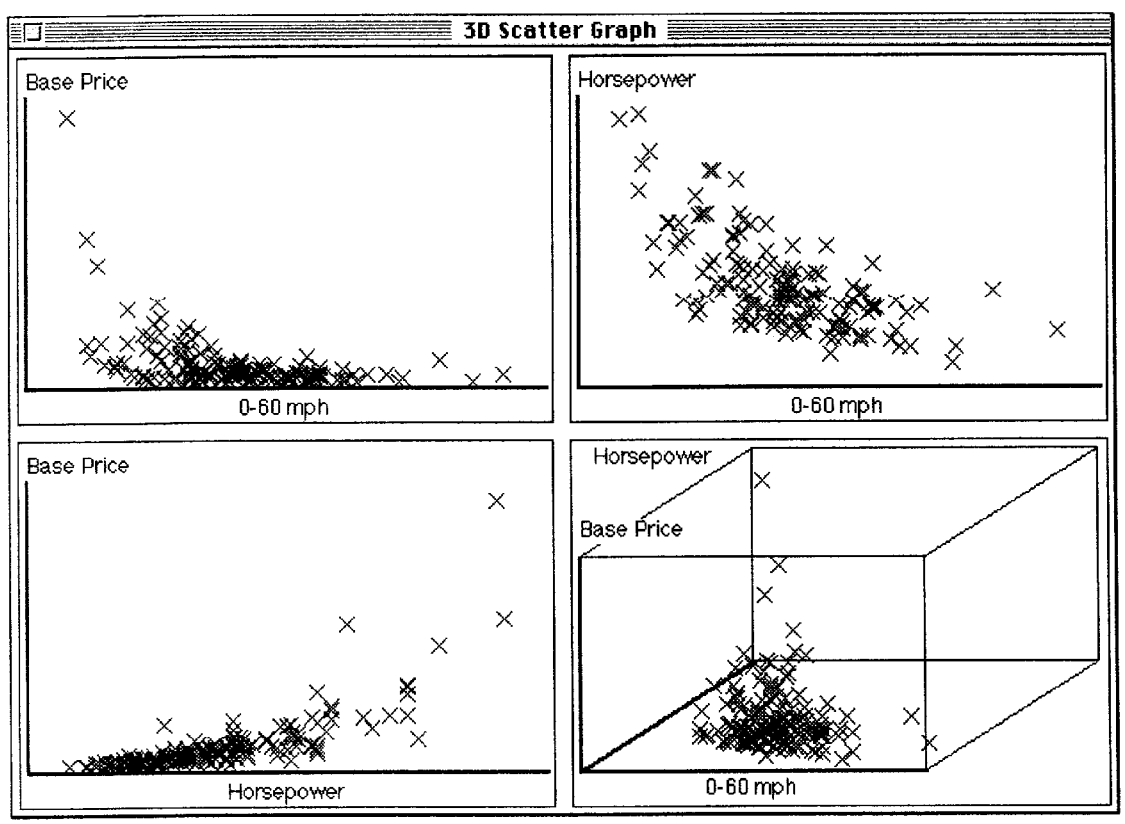
FIG. 23 is a set of scatter graphs showing comparisons of database items for various attributes.

In this case of just three attributes (e.g. Price, Horsepower, and Acceleration), a 2D or 3D scatter graph is adequate to situate each item according to its ratings and relative to the other items in the database for individual attributes, such as in FIG. 23. A display like this illustrates how similar a given car is to each of its neighbors: the farther the distance between two cars, the more different they are.

Figure 24:
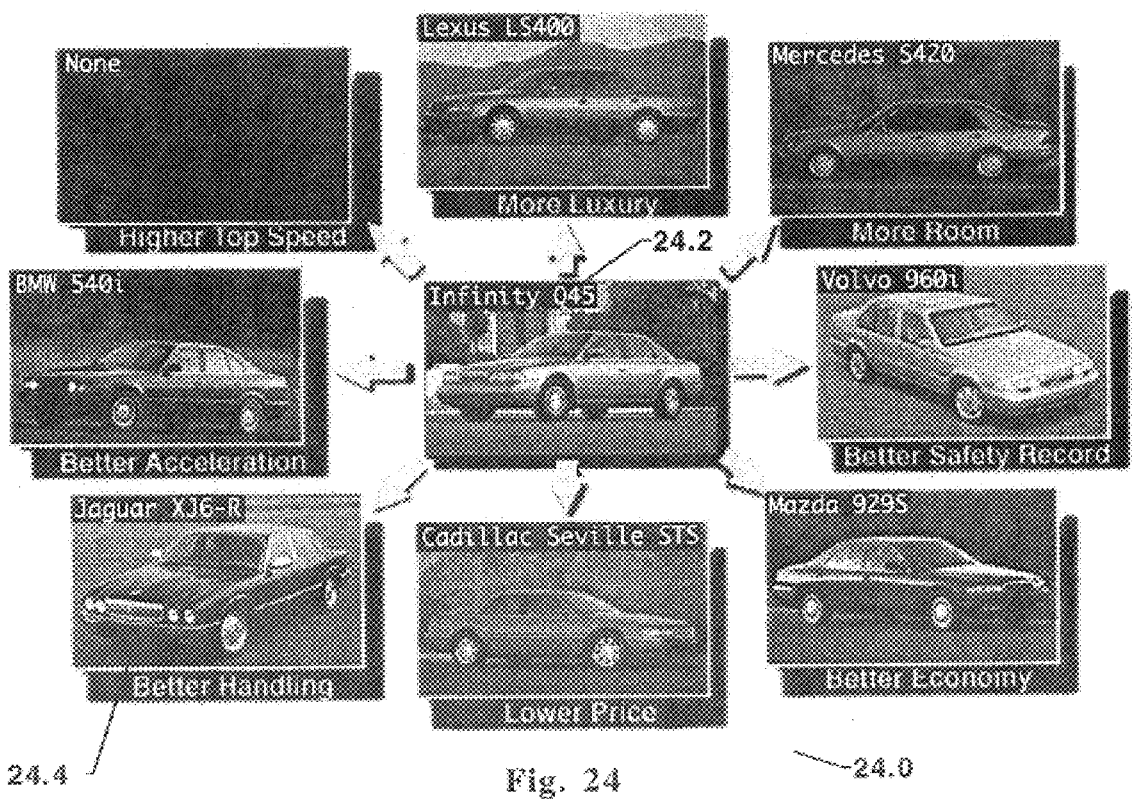
FIG. 24 is an illustration of one embodiment of the Navigator.

The Navigator extends the concept of similarity into more than three dimensions and offers a visual interface that allows a user to move from car to car in n-dimensional space, as illustrated in FIG. 24. The Navigator 24.0 includes a center pane 24.2 in which the currently selected item is shown. Surrounding the center pane is one attribute pane 24.4 for each additional attribute or dimension of an item. In FIG. 24, there are eight attribute dimensions, and thus eight attribute panes 24.4 surrounding the center pane 24.2. The example of FIG. 24 represents a slice out of an 8-dimensional space and shows the user those cars that are most similar to the currently selected one at the center pane 24.2, but which also differ, as indicated above the images. In each surrounding pane, the "nearest neighbor" item in the database to the currently selected item is displayed. For example, from the currently selected car in the center pane 24.2, the Infinity Q45, the nearest neighbor with respect to the Better Acceleration attribute is the BMW 540i, and is displayed in the attribute pane 24.4 for acceleration. Other attribute panes 24.4 shows the nearest neighbor items in each of the other attributes. Note that some attributes may not have a nearest neighbor to display, for example, the Higher Top Speed attribute is empty because there is no item in the database that has a higher top speed than the selected car.

Going back to the spatial paradigm in FIG. 13, the Navigator 24.0 "measures the distances" between the current item and all of the other items in the database with respect to each attribute. It then places the closest neighbor in the respective pane for the attribute. Thus, the car in the top left corner is most like the one in the center in all respects except Top Speed. The one at the top is most like the center one in all respects except Luxury, and so on.

The general formula for computing the partial derivative, i.e. the distance D, or similarity, of an item (e.g. a car) from the reference item, is $$D_{car} = \sqrt[n-1]{\sum_{\substack{i=1 \\ i \neq j}}^{n} (U_i - U_c)^{n-1} W_i}$$

where n=number of attributes

U=utility value, or "score"

W=relative weight of an attribute c=index of reference item j=index of current attribute.

The proximity metric weights the distance between the reference and other items in the database by the weighted $n^{th}$ power of the difference between the attribute values, and takes the $n^{th}$ root. This approach provides an accurate assesment of the similarity of an item to another item with respect to all of the attributes for the items. The pseudo code listing in Listing 5 provides one implementation of the formula above.

Listing 5

```
000    begin
                    Comment: create an array of floating point numbers to store score of each item
001    create (diff_array)
                    Comment: loop for all items
002    for each item in database do
                    Comment: don't compare reference item to itself
003        if item == reference_item
                    Comment: do the next item
004            do next item
                    Comment: initialize the sum total of all differences to zero
005        total_difference = 0
                    Comment: loop for each attribute
006        for each attribute do
                    Comment: difference is between the attribute scores of selected and reference
                    items
007            difference = attribute_score[item] –
               attribute_score[reference_item]
                    Comment: if this is the attribute that we're searching
008            if attribute == target_attribute
                    Comment: store the value
009                attribute_diff = difference
                    Comment: otherwise . . .
010            else
                    Comment: take the nth power of the difference and add it to the total
011                total_difference = total_difference +
               (difference power (num_attributes – 1))
                    Comment: do the next attribute
012        next attribute
                    Comment: take the nth root of the total and normalize it
013        total_difference = total_difference root (num_attributes –
           1) / (num_attributes – 1)
                    Comment: value_of returns a value (0 to 1) that indicates how close to the ideal
                    the attribute difference is to an ideal one (this is a non-linear function).
                    Multiply that by the similiarity (= 1 – difference) and get a value that indicates how
                    ideal a neighbor this item is
```

-continued

Listing 5

```
014     diff_array[item] value_of (attribute_diff) * (1 -
        total_difference)
                    Comment: do the next item
015     next item
                    Comment: sort the score array
016     sort (diff_array)
                    Comment: the first item in the array (if sorted in descending order) is the one
                    unless it has a negative value (which indicates that there exist no "better"
                    neighbors in the desired search direction)
017     display (diff_array[first_item])
                    Comment: all done
018     end
```

The source code in Appendix D implements the above pseudo code in C++. Line 14 weights the difference between a reference item and another item with respect to a given attribute by the overall similarity between the item and the reference item for all other attributes.

Figure 25:
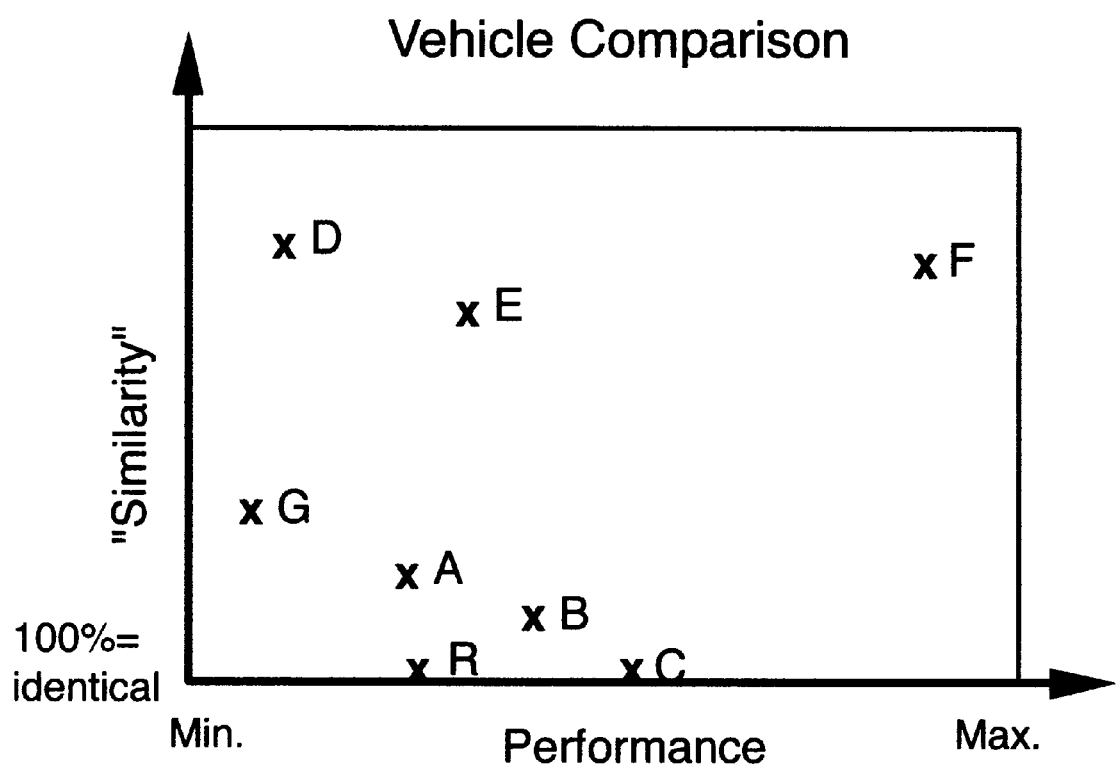
FIG. 25 is a plot of the similarity of nearest neighbors for a selected attribute.

The scatter charts in FIG. 25 shows, as an example, the results of the above calculation for cars A to G in reference to car R, with respect to a single attribute, Performance. The distance D, or similarity between R and the other cars with respect to all other attributes, is mapped onto the y-axis, and the utility value, or score, U onto the x-axis.

In a conventional proximity searcher car E would be selected as the nearest neighbor because it has just slightly more performance than car R In contrast, in the preferred embodiment of the Navigator, a heuristic function searches for the car that is "vertically closest" to the reference car R, and "a bit" to the right or left (depending on the search direction). Depending on the particular trade-off characteristics, either car B or C would be chosen to be most similar to car R, but with somewhat more Performance. Note that car A is not closer to car R with this proximity metric. In FIG. 25, if car C had a performance value at the maximum, then car B would be selected, using the heuristic of Listing 5, as the nearest neighbor. The reason that car B would be preferable is that there is an optimum desired increment in the user's quest for more performance, as defined by the utility function 14.0 constructed from the user's specification of critieria in the control window 13.10. That is, the user is not looking to maximize that attribute, but just get "somewhat" more of it. That ideal "somewhat", which may be user- and case-dependent, represents some distance along the x-axis. A car at that exact same spot on the axis as car R would be considered ideal since it is 100% similar to the reference car R and presents the desired increment in the search attribute.

FIG. 22 provides a flowchart of the process of using the Navigator 24.0 The process is started 22.0 and the user selects 22.2 one of the neighbors in an attribute pane 24.4 by clicking on its image or name. The Navigator 24.0 checks 22.4 to make sure the item is a valid selection, and if so, makes that item the current choice, i.e. move 22.8 it to the center pane 24.2. If the item is not valid 22.6, another item may be selected 22.2 for a validity determination. For each attribute, the Naviator 24.0 determines 22.10 22.12 the nearest neig or to the current item. If there is no such neighbor 22.16, a message is displayed 22.28, or the attribute pane 24.4 left empty. If there is such a neighbor 12.14 the image of the nearest neighbor is displayed 22.18.The entire "web" of closest neighbors is thus re-computed now relative to the new reference item.

For a particular reference item, the Navigator then considers whether there are more dimensions 22.20. If there are more dimensions 22.26, the Navigator determines 22.10 the nearest neighbor for the current reference item. If there are no more dimensions 22.24, the Navigator allows a new item to be selected 22.20. By repeatedly moving along the same or different axes (=attributes or dimensions), the user can explore the entire database while incrementally changing the desired mix of attributes.

Figure 26:
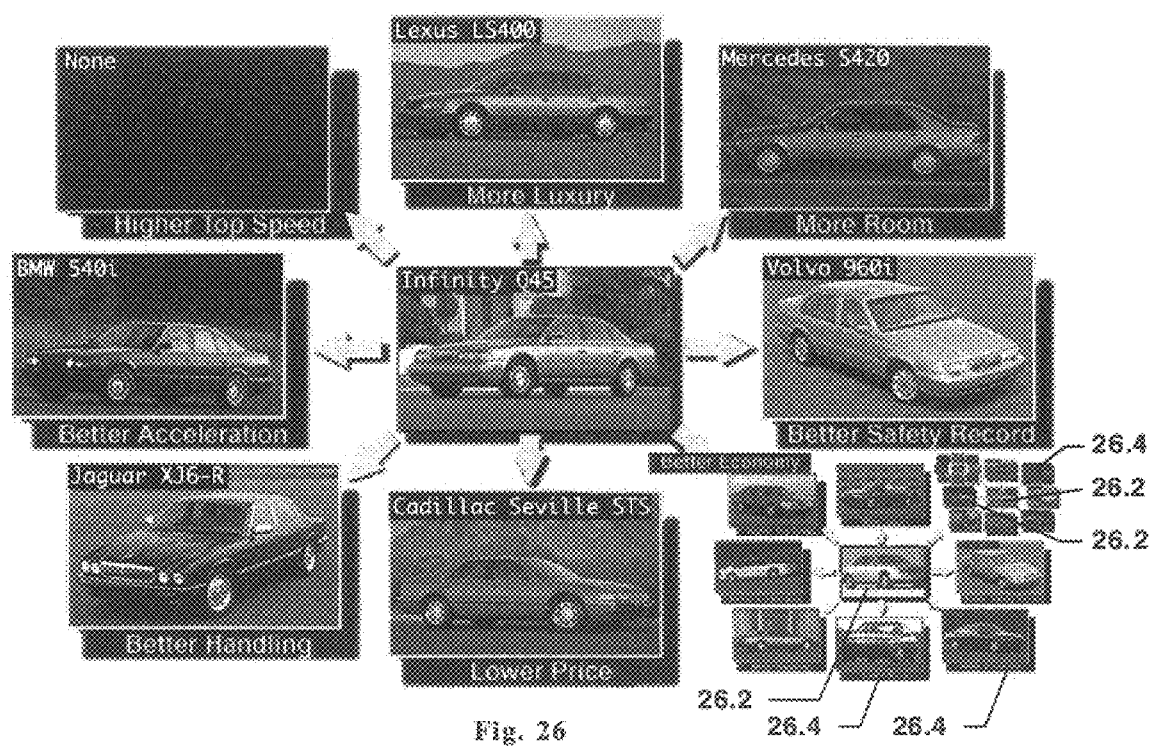
FIG. 26 is an illustration of an alternate embodiment of the Navigator including fractal extensions of the Navigator.

FIG. 26 illustrates the fractal nature of the web structure into which the Navigator organizes the database items. In this embodiment, for a user selected attribute, the Navigator 24.0 expands the attribute by displaying additional sub-Navigators, with each with a center pane 26.2 and surrounding attribute panes 26.4, for 1, 2, or more levels of data. For each level, the Navigator 24.0 replaces one attribute pane by taking the item in the attribute pane as the reference item and determining the nearest neighbors to item, and populating a set of attribute panes for that item. Using this fractal expansion the user can search large portions of the database while having a very intutive model of the relationships of each item to other items. Given unlimited display resolution, the entire web could be displayed and made random-accessible to the user.

D. Implementation Issues

All components of the Database Evaluation System 1.0 including the Authoring Tools may be written in Symantec C++ on the Macintosh platform. Porting to Microsoft Corp.'s Windows operating system has not yet been performed, however, the design of the software minimizes such effort, as much of the code as possible (about 75%) has been written without reliance on platform-specifics such as O/S calls and class libraries.

1. Authoring Tools

The Authoring Tools (2.2 of FIG. 2) is a stand-alone application. The only interface requirements are to the external database 2.0.

One currently implemented interface is to xBase and dBase format database files. The API comprises the following calls:

1. int DB_Init (void) Initialize the external database engine 2.6.
1. FILE* DB_OpenFile (char* fileName) Open specified database file.
2. int DB_GetNumFields (FILE* file) Returns the number of fields in the database file.
3. int DB_GetValue (FILE* file, char* fieldName, int fieldNum) Returns a pointer to the name of the specified field.
4. int DB_GetFieldType (FILE* file, int fieldnum) Returns the data type for the specified database field.

5. void DB_Close (FILE* file) Close the database file.

The Authoring Tools 2.2 outputs two types of files: domain models 2.10 and key scripts 2.12.

a) Domain Model

The output of the Authoring Tool 2.2 is a domain model 2.10 that structures the data in a hierarchical fashion as illustrated in FIG. 5.

A domain model 2.10 file consists of three sections:

1. Database filename

Since a domain model is specific to a particular database file, each domain model has its own name. A domain model may be applied to any number of different database file having the proper field names for matching to the domain model components listed below.

2. Domain definition list

This is a list of the names of the top-level attributes. These are the attributes presented to the user in the Attribute Equalizer.

3. Term list

A term (such as Economy or Braking in the FIG. 5. above) is defined as two or more terms or database fields related as described below.

All terms are compound variables and, as a consequence of the incommensurability of their constituents, can be measured only in arbitrary units which are refered to here as "utils". These can be considered the equivalent of a 1 to 10 scale. The actual range is from 0.0 to 1.0.

The calculation that leads to a score for a term is an expansion on qualitative and numerical sum and weight models used in multiple attribute utility theory, specifically:

$$S_{Car} = \sum_{i=1}^{n} f_i(U_i)W_i$$

where

S=total Score n=Number of attributes f=attribute-specific criterion function

U=Utility value

W=relative Weight of an attribute i=attribute Index

The parameters stored with each term in the domain model thus are:

1. Normalized weight where 0.0<Weight<1.0.
2. Criterion function Up to 16 values pairs relating input value to output "utils" with intermediate values being linearly interpolated.
3. Out-of-range handling Treatment mode (clip or alert) for values below minimum and above maximum.

b) Key Script

The second file type generated by the Authoring Tool 2.2 is the key script file 2.12. This file contains the following information:

Thumbnail field Name of the database field which contains a bitmap to be used as a thumbnail, if any.

Image field Name of the database field which contains a full-size image of the item, if any.

Key attribute list A list of criteria that are presented to the user for generating the short list 12.10 (FIG. 12). Each item in the key attribute list contains the following information:

UI controls Which are the UI controls used for setting those criteria, and what are the minimum and maximum values. The supported types of UI controls are:

Boolean: Checkboxes

Enums: Radio buttons

Floating point values: Single-thumbed slider

Ranges: Dual-thumbed slider

Custom functions: x-y diagram

Weight What are the relative weights of those criteria (used for calculating scores for partial matches).

2. DES Engine

The DES Engine 2.14 communicates with the following external modules as described in more detail below:

A. Key Script

B. Domain Model

C. User Interface

D. Database a) Key Script

The DES engine 2.14 to key script 2.12 ("KS") interface is not application-specific and therefore requires no modification. The API comprises the following calls:

1. FILE* KS_Create (char* fileName)

Create a new key script with given filename (used only by Authoring Tool 2.2).

2. FILE* KS_Open (char* fileName)

Open the specified key script (in typical applications, only one default script is used).

3. int KS_GetAttribute (FILE* file, attributeptr attr, int attrNum)

Reads an attribute structure from the file for the specified attribute.

4. int KS_GetThumbnailFieldName (FILE* file, char* fieldname)

Returns the name of the database field to be used for a thumbnail.

5. int KS_GetImageFieldName (FILE* file, char* fieldname)

Returns the name of the database field that contains a picture of the item.

6. int KS_Save (FILE* file)

Saves the key script referenced by file (used only by Authoring Tools 2.2).

7. void KS_Close (FILE* file)

Closes the specified script file.

b) Domain Model

Like the DES/KS interface, the DES to domain model 2.10 ("DM") interface is not application- or platform-specific. The interface calls are:

1. FILE* DM_Create (char* fileName)

Create a new domain model with given filename.

2. FILE* DM_Open (char* fileName)

Open the specified domain model file.

3. int DM_GetDatabaseFileName (FILE* file, char* fieldname)

Returns the name of the database to be used with this model.

4. int DM_GetNumTerms (void)

Returns the number of names in the list of top level domain attributes.

5. int DM_GetTermName (FILE* file, char* termName, int termNum)

Returns the name of the specified term.

6. int DM_GetTermData (FILE* file, TermPtr pTerm, int termNum)

Returns information about the specified term.

7. void DM_Close (FILE* file)

Closes the specified domain model.

c) User Interface

Since the user interface is highly implementation-specific and provides extensive functionality, the DES/Ul API contains by far the most calls. A user interface implementation for Macintosh and utilizes API calls organized into the following groups:

1) Data Viewer Module

As described above, the primary function of the Data Viewer module is to define various "hard" criteria, and to monitor their effect on the database items. The following functions make up the core of the API.

i) Control functions:

1. critptr UI_GetCriterionValue (char* criterionName)

Returns a pointer to a criterion type-specific structure. Such types range is from simple booleans to fuzzy sets.

2. int UI_SetCriterionValue (char* criterionName, critptr criterion).

Sets a criterion definition to the value(s) contained in the criterion parameter.

ii) Display functions:

1. int UI_GetThumbnail (thumbptr* thumb, int itemNum)

Returns a pointer to a bitmap containing a thumbnail to the requested item that is modified to reflect the item's score, i.e. the degree to which it matches the query.

2. int UI_GetItemScore (double* score, int itemNum)

Returns an item's score. This call allows the UI to handle the modification of bitmaps locally, instead of retrieving a bitmap every time.

3. int UI_CreateSLDisplay (PortHandle hport, Rect* area, SLDisplayPtr* ppDisplay)

This is a higher-level display function call. Together with the following SLDisplay-calls, it handles the management of a graph port that displays and updates the thumbnails in response to changes in selection criteria.

4. int UI_UpdateSLDisplay (SLDisplayPtr pDisplay)

Updates the specified display after a change in selection criteria has occured.

5. int UI_CloseSLDisplay (SLDisplayPtr pDisplay)

Closes the display and tidies up after itself.

iii) Miscellaneous functions:

1. int UI_InitShortList (listptr* ppList)

Creates a new short list and returns a pointer to it.

2. int UI_AddToShortList (listptr pList, int itemNum)

Adds an item to the specified short list.

3. int UI_RemoveFromShortList (listptr pList, int itemNum)

Removes an item from the specified short list.

2) Attribute Equalizer

The Attribute Equalizer allows a user to change the weights of the given attributes in real-time, as well as to load alternative domain models (DM_Open as described above). API functions include:

i) Control functions:

1. int UI_GetAttrWeight (char* attrName, double* attrValue)

Returns the current value for the weight of the specified attribute, ranging from 0.0 to 1.0.

2. int UI_SetAttrWeight (char* attrName, double attrvalue)

The inverse of UI_GetAttrWeight.

ii) Display functions:

1. int UI_GetItemScore (int itemNum, double* itemScore)

Returns the current score of a database item. This value is used to display an appropriate bar chart.

2. int UI_CreateEQDisplay (PortHandle hport, Rect* area, listptr shortList, EQDisplayPtr* ppDisplay)

This is a higher-level display function call that creates a bar graph in the specified rectangle of the specified graph port. The DES engine displays the scores for the items in the specified short list.

3. int UI_UpdateEQDisplay (EQDisplayPtr pDisplay)

Updates the specified display after a change in weights has occured.

4. int UI_CloseEQDisplay (EQDisplayPtr pDisplay)

Closes the graph and tidies up after itself.

iii) Miscellaneous functions:

1. int UI_SelectAEMode (int mode)

Selects from various Attribute Equalizer modes. A discussion of these modes is not contained in the current version of this document.

3) Navigator

The Navigator is, from a user interface-point of view, a very simple device to allow the user to explore most similar neighbors of a selected database item. Its simplicity keeps the list of API calls short:

1. int UI_SetNVModel (char* modelName)

Specifies which domain model to use for proximity calculations.

2. int UI_SetNVRefItem (int itemNum)

Specifies which database item becomes the navigator's reference item.

3. int UI_GetNVNeighbor (int attrNum)

Return the database item that is the closest neighbor in reference to the given attribute.

4. int UI_CreateNVDisplay (PortHandle hport, Rect* area, NVDisplayPtr* ppDisplay)

This is a higher-level display function call that creates a navigator display in the specified rectangle of the specified graph port. The DES engine 2.14 handles the display of bitmaps, attribute names, proximity scores, and so forth.

5. int UI_updateNVDisplay (NVDisplayPtr pDisplay)

Updates the specified display after a new reference item has been selected.

6. int UI_CloseNVDisplay (NVDisplayPtr pDisplay)

Closes the navigator display and tidies up after itself.

d) Database

The interface between the DES and the underlying database is the same as the API for the Authoring Tools, described above. Since the DES engine 2.14 does its own searching, the only frequent call to the database is the retrieval of values of a particular field for all records.

I claim:

1. A database evaluation system, comprising:

A database for storing a plurality of items, each item having a plurality of fields for storing data descriptive of the item;

an authoring module for defining a domain model having a hierarchical set of attributes, the attributes comprising: (1) at least one attribute hierarchically defined by a grouping of other attributes and (2) a plurality of attributes each of which is associated with a database field and is not hierarchically defined by other attributes, each field-associated attribute having a defined transfer function that maps a value in the field to a utility value of the attribute, and for each attribute, defining a weighting for the attribute relative to other attributes that are grouped together to define a hierarchical attribute;

an evaluation engine, coupling the domain model to the database and providing a first user interface for allowing a user to iteratively set at least one criterion for selecting and displaying a set of matching items comprising a short list, the evaluation engine allowing a user to inspect, compare, or navigate items on a short list;

a scoring interface coupled to the evaluation engine for displaying for each item from the short list a relative score of the item, and for displaying for at least one attribute of an item a direct manipulation mechanism for weighting a relative weight of the attribute, the evaluation engine redetermining the relative score of each item in the short list according to any change in the relative weighting of the attributes; and a proximity searcher user interface coupled to the evaluation engine for displaying a reference item from the database, for at least one attribute of the domain model, displaying a nearest neighbor item for the attribute as a function of a distance between the reference item and the nearest neighbor for the attribute.

2. The system of claim 1 wherein the relative scores are re-determined on about a real-time basis as a user adjusts the direct manipulation mechanism.

3. A method of constructing a domain model for a database for storing a plurality of items, each item having a plurality of fields of data, comprising:

defining a hierarchical plurality of attributes, the attributes comprising: (1) at least one attribute hierarchically defined by a grouping of other attributes and (2) a plurality of attributes each of which is associated with a database field and is not hierarchically defined by other attributes;

for each field-associated attribute, defining a transfer function that maps a value in the field to a utility value; and for each attribute, defining a weighting for the attribute relative to other attributes that are grouped together to define a hierarchical attribute.

4. The method of claim 3, further comprising:

receiving a selection of at least one pair of attributes, including a first attribute and a second attribute, as compensatory attributes, and an assignment of a weighting of values of the first attribute relative to values of the second attribute.

5. A database evaluation system, comprising:

A database for storing a plurality of items, each item having a plurality of fields for storing data descriptive of the item;

an authoring module for defining a domain model having a hierarchical set of attributes, the attributes comprising: (1) at least one attribute hierarchically defined by a grouping of other attributes and (2) a plurality of attributes each of which is associated with a database field and is not hierarchically defined by other attributes, each field-associated attribute having a defined transfer function that maps a value in the field to a utility value of the attribute, and for each attribute, defining a weighting for the attribute relative to other attributes that are grouped together to define a hierarchical attribute;

an evaluation engine, coupling the domain model to the database and providing a first user interface for allowing a user to iteratively set at least one criterion for selecting and displaying a set of matching items comprising a short list, the evaluation engine allowing a user to inspect, compare, or navigate items on a short list.

6. The system of claim 5 further comprising:

a scoring interface coupled to the evaluation engine for displaying for at least one item from the short list a relative score of the item, and for displaying for at least one attribute of an item a direct manipulation mechanism for weighting a relative weight of the attribute, the evaluation engine re-determining the relative score of a displayed item from the short list according to any change in the relative weighting of the attributes.

7. The system of claim 5 further comprising:

a proximity searcher user interface coupled to the evaluation engine for displaying a reference item from the database, for at least attribute of the domain model, displaying a nearest neighbor item for the attribute as a function of a distance between the reference item and the nearest neighbor for the attribute.

8. The system of claim 6 wherein the relative scores are re-determined on about a real-time basis as a user adjusts the direct manipulation mechanism.

* * * * *